United States Patent
Yilmaz et al.

(10) Patent No.: US 11,638,122 B2
(45) Date of Patent: Apr. 25, 2023

(54) QOS ASSOCIATED ON DEMAND POSITIONING SIGNALS FOR WIRELESS NETWORKS

(71) Applicant: Nokia Technologies Oy, Espoo (FI)

(72) Inventors: Osman Nuri Can Yilmaz, Espoo (FI); Diomidis Michalopoulos, Munich (DE); Taylan Sahin, Munich (DE)

(73) Assignee: Nokia Technologies Oy, Espoo (FI)

( * ) Notice: Subject to any disclaimer, the term of this patent is extended or adjusted under 35 U.S.C. 154(b) by 93 days.

(21) Appl. No.: 17/220,242

(22) Filed: Apr. 1, 2021

(65) Prior Publication Data

US 2022/0322036 A1 Oct. 6, 2022

(51) Int. Cl.
*H04W 4/029* (2018.01)
*G01S 5/02* (2010.01)
*H04W 28/02* (2009.01)

(52) U.S. Cl.
CPC ........... *H04W 4/029* (2018.02); *G01S 5/0244* (2020.05); *H04W 28/0268* (2013.01)

(58) Field of Classification Search
CPC .. H04W 4/029; H04W 28/0268; G02S 5/0244
USPC ..................................................... 455/456.1
See application file for complete search history.

(56) References Cited

U.S. PATENT DOCUMENTS

| | | | |
|---|---|---|---|
| 9,986,461 B2 * | 5/2018 | Dao | .......... H04L 47/76 |
| 2020/0028648 A1 | 1/2020 | Akkarakaran et al. | |
| 2020/0077358 A1 * | 3/2020 | Kovacs | .......... H04W 64/006 |
| 2020/0107286 A1 | 4/2020 | Akkarakaran et al. | |
| 2020/0154240 A1 | 5/2020 | Edge et al. | |

FOREIGN PATENT DOCUMENTS

| | | |
|---|---|---|
| WO | 2020/064120 A1 | 4/2020 |
| WO | 2020/069757 A1 | 4/2020 |

OTHER PUBLICATIONS

International Search Report and Written Opinion received for corresponding Patent Cooperation Treaty Application No. PCT/EP2022/057585, dated Jul. 25, 2022, 24 pages.

"On Demand Transmission of PRS for NR", 3GPP TSG-RAN WG2 Meeting #104, R2-1817902, Agenda: 11.8.2, Qualcomm Incorporated, Nov. 12-16, 2018, 27 pages.

(Continued)

*Primary Examiner* — Ted M Wang
(74) *Attorney, Agent, or Firm* — Nokia Technologies Oy

(57) ABSTRACT

Various example embodiments are described in which a network node transmits to a user device preconfiguration information for a plurality of on-demand positioning signal (ODPS) preconfigurations. An ODPS preconfiguration may be selected and communicated. The transmitted ODPS preconfiguration may be a request for transmission, or a notice of transmission, of the selected ODPS. An ODPS, which is associated with or based on the selected ODPS preconfiguration, may be transmitted. The ODPS may include any positioning signal (e.g., any signal that may be used for positioning) that may be transmitted upon request or as needed, and, e.g., may include downlink on-demand positioning reference signals (ODPRS), uplink on-demand sounding reference signals (ODSRS), or other positioning or reference signal.

29 Claims, 14 Drawing Sheets

(56) References Cited

OTHER PUBLICATIONS

"Discussion on On-demand reference signals for positioning", 3GPP RAN WG2 Meeting #113-e, R2-2100375, Agenda: 8.11.2.2, InterDigital Inc, Jan. 25-Feb. 5, 2021, 4 pages.
"3rd Generation Partnership Project; Technical Specification Group Radio Access Network; NR; Radio Resource Control (RRC) protocol specification (Release 16)", 3GPP TS 38.331 V1 6.3.1, Jan. 2021, pp. 1-932.
"3rd Generation Partnership Project; Technical Specification Group Radio Access Network; LTE Positioning Protocol (LPP) (Release 16)", 3GPP TS 37.355 V16.3.0, Dec. 2020, pp. 1-298.
"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.3.0, Dec. 2020, pp. 1-118.
"3rd Generation Partnership Project; Technical Specification Group Radio Access Network; Study on NR Positioning Enhancements; (Release 17)", 3GPP TR 38.857 V1.0.0, Dec. 2020, 526 Pages.
"Revised SID: Study on NR Positioning Enhancements", 3GPP TSG RAN Meeting #88e, RP-200928, Agenda: 9.1.1, CATT, Jun. 29-Jul. 3, 2020, 4 pages.
"On Demand Transmission of PRS for NR", 3GPP TSG-RAN WG2 Meeting #105, R2-1901373, Agenda: 11.8.2, Qualcomm Incorporated, Feb. 25-Mar. 1, 2019, pp. 1-15.
"Co-Ordination Among UE, gNB and Location Server for PRS Configuration and Feedbacks", 3GPP TSG RAN WG2#105, R2-1901533, Agenda: 11.8.3, Ericsson, Feb. 25-Mar. 1, 2019, pp. 1-3.
On-Demand and Dynamic PRS Configuration for DL-TDOA, R2-1916106, Agenda: 6.8.2.1, Nokia, Nov. 18-22, 2019, 5 pages.
"Measurements for PRS on-Demand", 3GPP TSG RAN WG1 #96bis, R1-1905265, Agenda: 7.2.10.4, Nokia, Apr. 8-12, 2019, 3 pages.
"Report on [Post1 12-e][608][POS] Support of on-demand PRS", 3GPP TSG-RAN WG2 #113e, R2-2101389, Agenda: 8.11.2, Ericsson, Jan. 25-Feb. 5, 2021, pp. 1-19.
"Solution Directions to Reduce end-to-end Latency", 3GPP TSG-RAN WG2 Meeting #112 electronic, R2-2009023, Agenda: 8.11.2, Intel Corporation, Nov. 2-13, 2020, 12 pages.
"On-demand PRS Transmission and Dynamic PRS Resource Allocation", 3GPP TSG-RAN WG2 Meeting #111 Electronic, R2-2007128, Agenda: 8.11.2, Nokia, Aug. 17-28, 2020, 6 pages.

* cited by examiner

```
                                    ┌──────────────────────────────────────────────┐
                                    │ Receiving, by a user device from a first      │
                                    │ network node, information for a plurality of  │
                                    │ on-demand positioning signal preconfigurations│
                                    │ that are supported by one or more network     │──1310
                                    │ nodes, wherein the information for the        │
                                    │ plurality of on-demand positioning signal     │
                                    │ preconfigurations includes information        │
                                    │ indicating a preconfiguration identifier and  │
                                    │ at least one quality of service (QoS)         │
                                    │ requirement or radio condition associated     │
                                    │ with each of the on-demand positioning        │
                                    │ signal preconfigurations                      │
                                    └──────────────────────────────────────────────┘
                                                         │
                                                         ▼
                                    ┌──────────────────────────────────────────────┐
                                    │ Selecting, by the user device, based on at    │
                                    │ least one of a measured radio condition or a  │──1320
                                    │ QoS requirement of a positioning session for  │
                                    │ the user device, one of the on-demand         │
                                    │ positioning signal preconfigurations          │
                                    └──────────────────────────────────────────────┘
                                                         │
                                                         ▼
                                    ┌──────────────────────────────────────────────┐
                                    │ Transmitting, by the user device to one or    │──1330
                                    │ more network nodes, a preconfiguration        │
                                    │ identifier associated with the selected       │
                                    │ on-demand positioning signal preconfiguration │
                                    └──────────────────────────────────────────────┘
                                                         │
                                                         ▼
                                    ┌──────────────────────────────────────────────┐
                                    │ Transmitting, by the user device to one or    │──1340
                                    │ more network nodes, including the first       │
                                    │ network node, an on-demand positioning        │
                                    │ signal based on the received preconfiguration │
                                    │ identifier                                    │
                                    └──────────────────────────────────────────────┘
```

FIG. 13

QOS ASSOCIATED ON DEMAND POSITIONING SIGNALS FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; selecting, by the user device, based on at least one of a measured radio condition or a QoS requirement of a positioning session for the user device, one of the on-demand positioning signal preconfigurations; transmitting, by the user device to the at least one network node, a preconfiguration identifier associated with the selected on-demand positioning signal preconfiguration; and receiving, by the user device from the at least one network node, an on-demand positioning signal based on the transmitted preconfiguration identifier.

According to another example embodiment, a method may include transmitting, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; receiving, by the network node, a preconfiguration identifier associated with a selected on-demand positioning signal preconfiguration that was selected based on at least one of a measured radio condition or a QoS requirement of a positioning session for the user device; and transmitting, by the network node to the user device, an on-demand positioning signal based on the received preconfiguration identifier.

According to another example embodiment, a method may include receiving, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; receiving, by the user device from the at least one network node, a preconfiguration identifier associated with a selected on-demand positioning signal preconfiguration that was selected based on at least one of a radio condition or a QoS requirement associated with a positioning session for the user device; receiving, by the user device from the network node, at least one on-demand positioning signal based on the received preconfiguration identifier received from the at least one network node; measuring, by the user device as part of the positioning session to at least assist in determining a position of the user device, at least one signal parameter of the received at least one on-demand positioning signals; and either determining, by the user device, a position of the user device based on the at least one measured signal parameter, or transmitting, by the user device to another node or a location management function, the at least one measured signal parameter of each of the received at least one on-demand positioning signal.

According to another example embodiment, a method may include receiving, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; receiving, by the user device from the first network node, a preconfiguration identifier of a selected on-demand positional signal preconfiguration that was selected based on at least one of a measured radio condition or at least one QoS requirement associated with a positioning session for the user device; and transmitting, by the user device to a plurality of network nodes, including the first network node, an on-demand positioning signal based on the received preconfiguration identifier.

According to another example embodiment, a method may include transmitting, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; transmitting, by the network node to the user device and at least one second network node, a preconfiguration identifier associated with a selected uplink on-demand positioning signal preconfiguration, to cause the user device to transmit the uplink positioning signal associated with the transmitted preconfiguration identifier; and receiving, by the network node from the user device, an on-demand uplink positioning signal based on the transmitted preconfiguration identifier.

According to another example embodiment, a method may include receiving, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; selecting, by the user device, based on at least one of a measured radio condition or a QoS requirement of a positioning session for the user device, one of the on-demand positioning signal preconfigurations; transmitting, by the user device to one or more network nodes, a preconfiguration identifier associated with the selected on-demand positioning signal preconfiguration; and transmitting, by the user device to one or more network nodes, including the first network node, an on-demand positioning signal based on the received preconfiguration identifier.

Additional example embodiments are provided corresponding to each of the methods, including at least the following for each of the methods: An apparatus that include means for performing each of the methods; An apparatus including at least one processor; and at least one memory including computer program code; the at least one memory and the computer program code configured to, with the at least one processor, cause the apparatus at least to perform the method; And, a non-transitory computer-readable storage medium comprising instructions stored thereon that, when executed by at least one processor, are configured to cause a computing system to perform a method.

The details of one or more examples of embodiments are set forth in the accompanying drawings and the description below. Other features will be apparent from the description and drawings, and from the claims.

BRIEF DESCRIPTION OF THE DRAWINGS

FIG. 13 is a flow chart illustrating operation of a user device according to another example embodiment.

DETAILED DESCRIPTION

Figure 1:
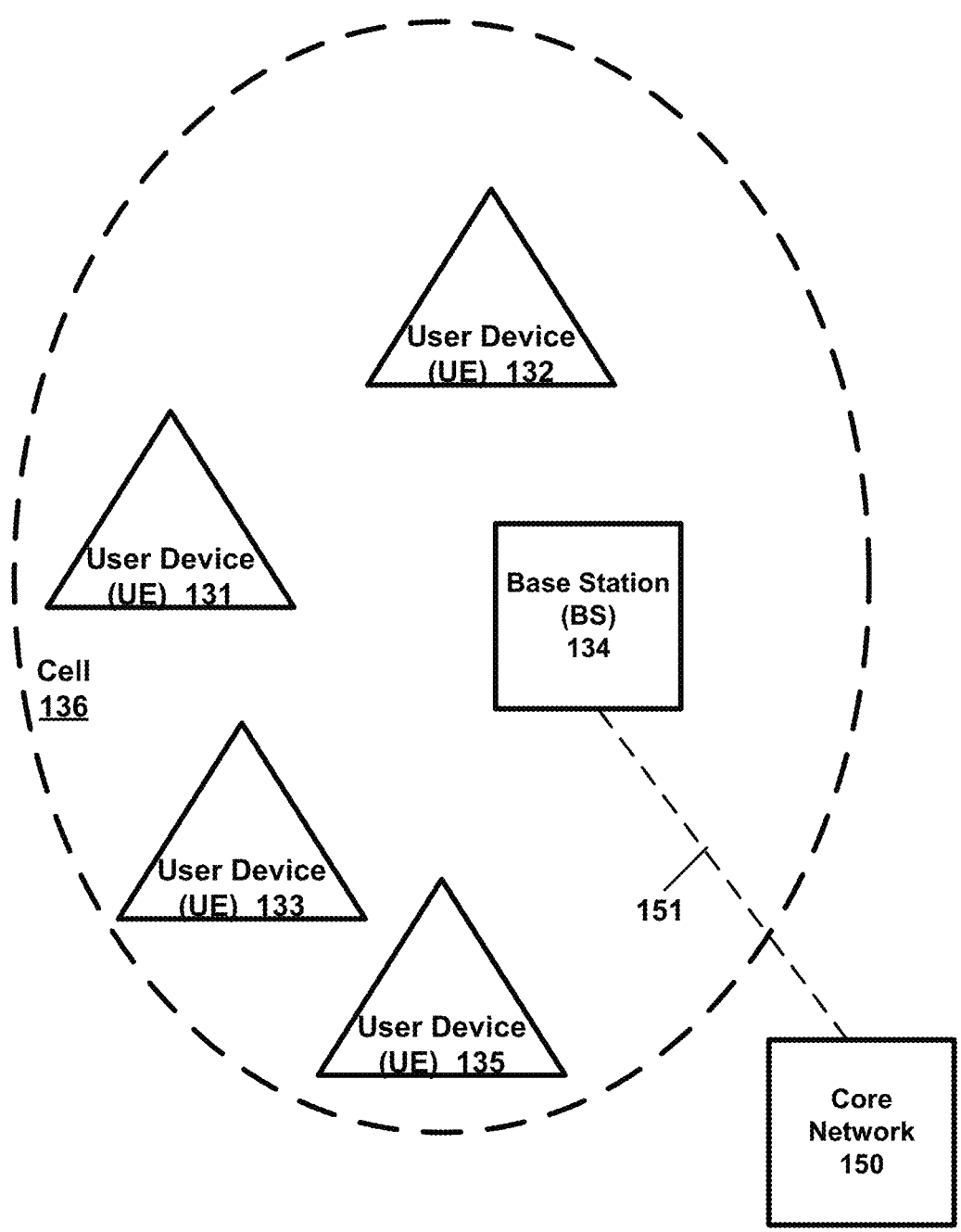
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), or a next generation Node B (gNB). The terms user device and user equipment (UE) may be used interchangeably. A BS may also be referred to as a RAN (radio access network) or NG-RAN (next generation radio access network) node. At least part of the functionalities of a BS (e.g., AP, gNB, eNB, RAN node) may also be carried out by one or more network nodes, servers or hosts, such as a centralized unit (CU) and a distributed unit (DU) in a split RAN architecture, which may be operably coupled to a remote transceiver, such as a remote radio head (RRH). BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

According to an illustrative example, a BS (e.g., AP, eNB, gNB, RAN node) may be part of a mobile telecommunication system. A RAN may include one or more RAN nodes (e.g., AP, BSs, eNBs, gNBs) that implement a radio access technology, e.g., to allow one or more UEs to have access to a network or core network. Thus, the RAN nodes reside between one or more user devices or UEs and a core network. According to an example embodiment, each RAN node may provide one or more wireless communication services for one or more UEs or user devices, e.g., to allow the UEs to have wireless access to a network, via the RAN node. Each RAN node may perform or provide wireless communication services, e.g., such as allowing UEs or user devices to establish a wireless connection to the RAN node, and sending data to and/or receiving data from one or more of the UEs. For example, after establishing a connection to a UE, a RAN node may forward data to the UE that is received from a network or the core network, and/or forward data received from the UE to the network or core network. RAN nodes may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, a wearable device, as examples, or any other wireless device. It should be appreciated that a user device may also be (or may include) a nearly exclusive uplink only device, of which an example is a camera or video camera loading images or video clips to a network.

Core network 150 may include a mobility management entity (MME) or an access and mobility management function (AMF), which may control access to the network, and handle or assist with mobility/handover of user devices between BSs, one or more gateways that may forward data between the BSs and a packet data network or the Internet, and other control nodes, functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G/New Radio (NR), or any other wireless network or wireless technology operating on cmWave and/or mmWave bands, and to a wide variety of communication services, such as IoT, MTC, eMTC, eMBB, URLLC, etc. These example networks, technologies or data service types are provided only as illustrative examples.

In some cases, a UE positioning session (or positioning procedure) may be used to determine a location or geographic position of a UE (or mobile device) or of an asset that is being tracked. In some examples, UE positioning may be performed or determined based on positioning signals, such as positioning reference signals (PRSs), sounding reference signals (SRSs), or other reference signals. Positioning signals may include any signals that may be used to determine or estimate a position of a UE, node or object. Downlink positioning reference signals (PRSs) and uplink (UL) sounding reference signals (SRSs) are examples of positioning signals, and other positioning signals may be used. Some example positioning procedures may include Time Difference of Arrival (TDOA), such as downlink-TDOA (DL-TDOA), DL (downlink) Angle of Departure (DL-AoD), multi-round trip time (multi-RTT) positioning, or other positioning or location techniques. Applications or use cases may exist or arise where the network may track a location of a UE(s) or asset. As part of a positioning procedure, a UE, or other device, may measure and report measured signal parameter(s) of positioning signals (e.g., DL PRS signals), to allow a network to track the UE's (and thus the asset's) location (or position). There may exist applications or uses where it may be useful to track a (e.g., geographic) position of an asset, such as tracking a position of a valuable object, tracking a package or container shipment, employee badge tracking, etc.

As noted, a positioning signal may be, or may include, any signal (e.g., any positioning signal, or any reference signal) that may be used, or may be capable of being used (e.g., based on one or more signal measurements of such positioning signal), to measure or estimate a location of a UE or other object. There may be (or may exist) downlink (DL) positioning signals (e.g., DL positioning reference signals (PRS) signals) transmitted by a network node (e.g., gNB) to a UE, and there may be uplink (UL) positioning signals (e.g., such as a sounding reference signals (SRS)) transmitted by a UE to other nodes (such as to one or more gNBs or network nodes), which may be used, as part of a positioning session (or positioning occasion or positioning procedure), to determine a position of a UE (or other node, device or object). These are example positioning signals, and other positioning signals may be used.

For example, based on received DL positioning signals (e.g., based on DL PRS signals), a UE may measure one or more signal parameters (e.g., phase and/or amplitude, or other signal parameter) of a received DL positioning signal from each of multiple positioning signal sources (e.g., from multiple gNBs), and then the UE may determine (or estimate) its own position (or location) based on the signal measurements and known locations of the positioning signal sources (or locations of the gNBs). The UE may then forward its estimated position to its serving gNB, or to a location entity such as a location management function (LMF), which may be provided on a network node, on a node in the cloud, or within a core network. Alternatively, the UE may forward its signal measurements (measurements of phase or other signal parameters of received DL positioning signals) to a serving gNB and/or to the LMF, where the gNB and/or LMF may then determine the UE's position based on these signal measurements. Also, for example, based on a request for UE position (e.g., by an application or another node), the LMF may initiate or request a positioning session for the UE (e.g., in order to obtain a position of the UE, or to obtain signal measurements that may be used by the LMF to determine the UE position). The LMF may determine or estimate the UE's position based on the received signal parameters or signal measurements, or the LMF may receive the UE position as estimated by the UE). The LMF may, for example, report or send the UE's position to a requesting node or application (e.g., to the serving gNB, a neighbor gNB, or an application running on a node or device within a network, which may have requested a position of the UE). Different positioning sessions, and/or different applications or nodes that may have requested a position of a UE, may have different positioning requirements, e.g., in terms of positioning accuracy, latency, and the like.

In the uplink direction, for example, a UE may transmit sounding reference signals (SRS) to multiple gNBs, and where multiple gNBs may perform signals measurements (e.g., phase and/or amplitude measurements) on the received SRS signals. The gNBs may then forward their signal measurements to the LMF, where the LMF may determine or estimate the UE's position.

According to an example embodiment, rather than having a gNB (or a UE) continuously or periodically transmit positioning signals, positioning signals may be provided or transmitted on-demand (or upon request). Based on the use of beamforming transmissions within 5G/NR, positioning signals may also be transmitted in the direction where there is at least one receiving node (e.g., UE or gNB) which will receive and process them for deriving the position (location) of the UE (either at the UE itself or at the network side after the measurements are reported to the network). An on-demand positioning signal (ODPS) may include any positioning signal (e.g., PRS, SRS or other reference signal) that may be transmitted upon request or as needed for positioning. Thus, on-demand positioning signals (ODPS) may include, for example, on-demand positioning reference signals (ODPRS), or on-demand sounding reference signals (ODSRS), or any other positioning or reference signal that may be transmitted upon request or as needed for positioning.

In NR/5G, signals may be transmitted directionally using beamforming (using narrow beams in specific directions to enhance signal transmission range and coverage). Thus, positioning signals may also be transmitted in specific directions using beamforming. Thus, to avoid transmitting a positioning signal in all or multiple directions (using different beams), the transmission of on-demand positioning signals is a more resource-efficient approach.

As noted, various positioning sessions (or positioning procedures) may have different positioning requirements or quality of service (QoS) requirements. For example, some applications, such as self-driving vehicles, may have very high positioning requirements (e.g., in terms of positioning accuracy and/or maximum latency), while other applications (e.g., tracking of storage containers) may have much lower positioning requirements (e.g., requiring a lower positioning accuracy and/or tolerating a higher latency for positioning). Therefore, according to an example embodiment, resources or signal attributes or signal parameters (e.g., time-frequency resources of the positioning signals, positioning bandwidth, periodicity of the positioning signals, signal transmission power of the positioning signals, beam resources of the positioning signals, . . . ) for transmission of an on-demand positioning signals (ODPS) signal may thus be configured to meet the different QoS requirements of a positioning session for the UE (to obtain a position of the UE). Thus, an ODPS configuration may include one or more positioning signal attributes or parameters (e.g., time-frequency resources, bandwidth, periodicity, transmission power, beam or spatial resources, . . . ) of an ODPS. A higher amount of ODPS resources may be required to transmit ODPS signals for a more demanding (e.g., having a higher QoS requirement, such as a higher positioning accuracy requirement) positioning session.

As noted, different applications or nodes may have different positioning requirements or different QoS requirements for a positioning session for a UE. Some applications may require, for example, very high positioning accuracy and low latency, while other applications may require a lower positioning accuracy. Also, some applications may be associated with higher QoS class priority, while others associated to a rather "best effort" QoS class. Thus, use of only a single ODPS configuration for positioning signals (or a single positioning signal configuration) may not be an efficient or optimal approach to meeting the QoS requirements of different positioning sessions, as that may result in over-fulfilling ODPS resource (or positioning performance) requirements (or QoS requirements) for less demanding applications or positioning sessions, and under-fulfilling (or not meeting) ODPS resource or QoS requirements for more demanding applications or positioning sessions.

According to an example embodiment, it may be advantageous for a network (or network node or gNB) to offer or provide different or multiple selectable ODPS configurations, e.g., in order to meet different positioning requirements or QoS requirements for different positioning sessions that may be used to obtain a position of various UEs. Thus, for example, a UE/gNB signalling or message exchange may be performed to coordinate or communicate regarding QoS configurations and/or requirements of a positioning session (e.g., requirements as to positioning accuracy, latency, or other positioning requirement), e.g., to allow the ODPS signal transmitter (e.g., UE or gNB) to match the configuration of the transmitted ODPS signal to a positioning QoS requirement of a positioning session. However, in some cases, coordinating or negotiating ODPS configuration parameters between a UE and gNB may be relatively complex, and/or may introduce significant latency or delay, which may be unacceptable, or may decrease performance, for many applications or positioning sessions.

Therefore, various example embodiments described herein are directed to techniques that may be used to overcome one or more of these challenges, and/or may be used to support a selection of an ODPS configuration of a plurality of ODPS configurations (or preconfigurations), while reducing or limiting latency or delays. The various embodiments may be used to address (at least partially) the problem of increased latency associated with ODPS (e.g., such as on-demand positioning reference signal) signalling. The various embodiments described herein may enhance an ODPS procedure, e.g., by reducing the respective latency of such positioning session or procedure, without trading off the service requirement. Furthermore, the same ODPS configuration(s), even if preconfigured, may not satisfy the needs of the UEs as they usually have different (and/or varying) positioning service requirements and experience different radio conditions.

According to an example embodiment, various techniques are described to allow an efficient configuration (or preconfiguration) of an on-demand positioning signal (ODPS). The ODPS may include DL ODPS signals (e.g., such as positioning reference signals (PRS)), or UL ODPS signals (e.g., sounding reference signals (SRS)), or other positioning signals. Thus, techniques are described that may allow configuration, or a preconfiguration of DL ODPS signals transmitted by a network node (e.g., gNB), and that may allow configuration of UL ODPS signals transmitted by a UE (or user device). For example, ODPS preconfigurations may be or may include ODPS configuration options that may be provided or communicated in advance, or before initiation of a positioning session, and which may be selected for transmission. To improve ODPS configuration efficiency, a network node (e.g., gNB) may transmit to a UE (e.g., prior to a particular positioning session) information for a plurality of on-demand positioning signal preconfigurations that are supported by one or more network nodes (e.g., supported by the serving network node and/or supported by one or more neighbor network nodes), wherein the information for the plurality of on-demand positioning signal preconfigurations may include: 1) information indicating a preconfiguration identifier, and 2) at least one (or at least one of a) quality of service (QoS) requirement or radio condition associated with each of the on-demand positioning signal preconfigurations. Thus, in order to simplify (and/or reduce latency for) selection of a particular ODPS preconfiguration for an ODPS signal, the network node may indicate at least one of a QoS requirement or a radio condition, associated with each ODPS preconfiguration. This may allow a node to select an ODPS preconfiguration, based on QoS requirement or radio condition.

For example, the on-demand positioning signal preconfigurations may include on-demand positioning signal configurations (e.g., which are supported by the network or gNB) that have not yet been selected or configured for transmission, but which may be selected or requested by a UE or gNB for transmission. Thus, ODPS preconfigurations refer to (or may include) ODPS configuration options that may be communicated to UEs in advance (e.g., before a particular positioning session has started, in order to reduce latency of the positioning session), and that may be selected or requested for transmission (by either the UE or gNB), e.g., in order to meet requirements of a positioning session for a UE (to determine a position of the UE).

For example, information (e.g., configuration information for ODPS signals) may be received by a UE from a gNB that indicates that a first ODPS preconfiguration is associated with a first QoS requirement (e.g., providing or able to meet a requirement for high positioning accuracy), and a second ODPS preconfiguration is associated with a second QoS requirement (e.g., providing only low positioning accuracy). Thus, the node (either UE or gNB) that may be aware of the QoS requirement of the positioning session for the UE may select (e.g., based on a QoS requirement of the positioning session) and communicate the preconfiguration identifier of a selected ODPS preconfiguration to the other node. For example, an ODPS preconfiguration may be selected that has an associated QoS requirement or radio condition that matches or most closely matches a QoS requirement or radio condition of a positioning session. For example, a UE that has determined that a positioning session for the UE (requesting position or measurements to obtain the UE's position) requires high positioning accuracy would transmit to the gNB the preconfiguration identifier of the first ODPS preconfiguration (associated with high positioning accuracy). Likewise, a UE that has determined that a positioning session for the UE (requesting position or measurements to obtain the UE's position) requires only a low positioning accuracy would transmit to the gNB the preconfiguration identifier of the second ODPS preconfiguration (associated with a low positioning accuracy). In another example, a UE that requires only low priority positioning session may select an ODPRS preconfiguration associated with a "best effort" QoS class associated with basic PRS periodicity, while another that requires higher priority may select another ODPRS preconfiguration associated with a higher priority QoS class with higher PRS periodicity.

Either a UE or a gNB may select one of the ODPS preconfigurations, e.g., based on either a QoS requirement of a positioning session, or based on a (e.g., measured) radio condition. For example, an ODPS preconfiguration may be selected that matches (or most closely matches) or corresponds to, or would meet the requirements of, a measured radio condition or QoS requirement of a positioning application. Thus, as an illustrative example, the UE or gNB may compare a measured radio condition or QoS requirement of a positioning session to the radio condition(s) and/or QoS requirement(s) associated with each of the received ODPS preconfigurations, e.g., in order to select the ODPS preconfiguration that has an associated QoS requirement or radio condition that matches (or most closely matches, or would satisfy such requirements) the measured radio condition or QoS requirement of the positioning session. Other techniques may be used to select one of a plurality of ODPS preconfigurations.

For example, the QoS requirement may include, e.g., one or more of: a positioning accuracy required by the positioning session; a latency, or a maximum latency required by the positioning session of an on-demand positioning signal, or QoS class priority, or other QoS requirement.

Also, for example, a radio condition may include, e.g., a received signal strength indication (RSSI), a signal-to-interference plus noise ratio (SINR), a reference signal received power (RSRP), a reference signal received quality (RSRQ), or other radio condition.

For example, a gNB may provide information (e.g., ODPS preconfiguration information), including a first preconfiguration identifier of a first ODPS preconfiguration (e.g., that uses a larger amount of ODPS resources) that is associated with a relatively a poor radio condition (e.g., a low RSRP), e.g., to ensure that sufficient ODPS resources are provided to still allow positioning of the UE to be performed in the case of such a poor radio condition. In this example, the UE or gNB may measure a (e.g., current) radio condition (e.g., measure the RSRP of received reference signals). If the measured radio condition matches (or most closely matches), or is similar, or within a range, etc., of the RSRP for this first ODPS preconfiguration, the UE or gNB may select this first ODPS preconfiguration having an associated poor radio condition (e.g., having an associated RSRP) that matches or most closely matches the measured RSRP. This example of a selection is merely one illustrative example, and other criteria, comparisons, or selection processes may be used to select one of a plurality of ODPS preconfigurations, e.g., based on a measured radio condition or a QoS requirement of a positioning session.

After selecting an ODPS preconfiguration, the UE or gNB may transmit to the other node the preconfiguration identifier associated with the selected on-demand positioning signal (ODPS) preconfiguration. Transmission of the preconfiguration identifier (for the selected ODPS preconfiguration) may operate (and/or be interpreted by the receiving node) as a request for transmission of an ODPS signal of the indicated preconfiguration/configuration, or may operate as an indication that the other node should expect to receive (and e.g., should perform signal measurements for) an ODPS signal of the indicated preconfiguration/configuration (depending on whether the ODPS signals are DL signals or UL signals). The UE or gNB would then transmit the ODPS signal of the indicated preconfiguration/configuration.

The UE may select and transmit a preconfiguration identifier to the gNB indicating a selected ODPS preconfiguration. For UL ODPS signals (e.g., SRS signals), the UE may transmit to gNB(s) the ODPS signals (e.g., UL SRS signals) that have a configuration (or ODPS preconfiguration) that is indicated by the transmitted preconfiguration identifier. Likewise, for DL ODPS signals (e.g., DL PRS signals), the UE may then receive from a gNB, an ODPS signal having a configuration (or ODPS preconfiguration) that is indicated by or based on the transmitted preconfiguration identifier.

Similarly, the gNB may select and transmit a preconfiguration identifier to the UE indicating a selected ODPS preconfiguration. For DL ODPS signals (e.g., PRS signals), the UE may then receive from the gNB the ODPS signal from the gNB having a configuration (or ODPS preconfiguration) indicated by the received preconfiguration identifier. For UL ODPS signals, the UE may then transmit to the gNB (or to multiple gNB s, such as to the serving gNB and one or more neighbor gNB s) an UL ODPS signal (e.g., SRS signal) having an ODPS configuration (or ODPS preconfiguration) indicated by the received preconfiguration identifier.

Thus, by the network node (e.g., gNB) communicating to the UE (e.g., in advance, or before a particular positioning procedure has been performed) information (e.g., ODPS preconfiguration information) for a plurality of on-demand positioning signal (ODPS) preconfigurations that are supported by one or more network nodes, the UE may then select and transmit a preconfiguration identifier to the gNB, or the UE may receive from the gNB, a selected preconfiguration identifier. The UE may then receive or transmit an ODPS signal, based on the selected preconfiguration identifier. In this manner, through the communication to the UE of the information for a plurality of ODPS preconfigurations, this may simplify the selection of a particular ODPS configuration/preconfiguration, and may and reduce latency associated with the communication of such selected ODPS preconfiguration to the other node (and/or may reduce latency for the overall positioning session).

Also, each ODPS preconfiguration may, for example, include one or more positioning signal attributes or parameters, in order to provide a particular ODPS or positioning performance or QoS. Values for one of more of the positioning signal attributes may be different among different ODPS preconfigurations. For example, each ODPS preconfiguration may include at least one of the following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

As noted, various example embodiments described herein may associate each ODPS configuration with one (or more) quality of service (QoS) class/level/requirement when the respective ODPS configurations are pre-configured by the network. As described, preconfiguration ODPS configurations may be performed by the gNB sending information (e.g., preconfiguration information) to a UE that includes information (e.g., preconfiguration information) for a plurality of on-demand positioning signals (ODPSs) (e.g., such as for DL on-demand PRS signals, and/or UL on-demand SRS signals, as illustrative examples). The information (e.g., preconfiguration information) provided for a plurality of ODPS preconfigurations may include a preconfiguration identifier and at least one quality of service (QoS) requirement (e.g., such as a QoS class) or radio condition associated with each ODPS preconfiguration.

In one of the embodiments, RRC (radio resource control) signalling (e.g., RRC reconfiguration, RRC connection setup/release) can be used by the network (e.g., gNB or network node) to convey the preconfiguration information to the UEs before the UEs are involved in an active positioning session (e.g., such as a LTE positioning protocol (LPP) session) to perform measurements to determine a position of a UE or other node or device. In another embodiment, instead of RRC, the network can use LPP signalling to deliver preconfiguration information to UEs. In another embodiment, the UE may request the list of ODPS preconfigurations proactively, i.e., before initiating an mobile originated location request (MO-LR) or requesting assistance data to calculate its own, UE-based, position.

To minimize the signalling overhead, the ODPS preconfiguration information can be broadcast, multicast, or only unicast to a subset of UEs (e.g., the ones that may use MO-LR or operating in the UE-based positioning mode). In one of the related embodiments, such UEs could be determined by looking into the relevant UE capability information or requesting the information from gNB or other network entities that may store the UE capability information. In another embodiment, the subset of UEs (that should receive the preconfiguration information) may be determined based on the history of the previous positioning sessions.

In yet another embodiment, the network (e.g., gNB or network node) may provide or transmit a default ODPS preconfiguration to UEs by transmission of system information, e.g., such as by transmitting a special positioning system information blocks (posSIBs), or other SIB. In a complementary embodiment, the broadcast preconfiguration information may be valid only for the UEs that are not involved in an active positioning session.

In one of the embodiments, the preconfiguration information (indicating preconfigured set of ODPS configurations) may be transmitted or signalled to the UEs before the UEs are involved in a positioning session to maximize the latency gain. In a further embodiment, the UE may obtain the ODPS preconfiguration information before the LPP request capability message in case of mobile-terminated location request (MT-LR) in UE-assisted positioning. In another embodiment, the UE may obtain the preconfiguration before the location service (LCS) request in case of mobile originated location request (MO-LR) in UE-assisted positioning. In another embodiment (UE-based positioning), the UE may obtain the preconfiguration information before the assistance data used at the UE for i) initiating measurements at the specified ODPS resources (such as PRS resource information) and ii) for calculating the location of the UE (such as coordinates of gNBs and transmission points (TRPs), potential time-drifts of TRPs for timing-based methods, beam configurations of TRPs, etc.).

In one of the embodiments, aforementioned QoS class (or QoS level, or QoS requirement) can be further associated with a potential LCS (location service) request by the UE (MO-LR (mobile originated location request)) for UE-assisted positioning, or with a request for assistance data in UE-based positioning. That is, the network specifies to the UE what particular ODPS configuration (or preconfiguration), which is preconfigured, should be selected by the UE for a given QoS level. In one of the related embodiments, QoS class/level may refer to the location service requirements in terms of positioning accuracy. In another, it may refer to both latency and accuracy.

In one of the further embodiments, for a QoS level A involving high accuracy and low latency, the configuration X should be used, whereas for QoS level B involving high accuracy but is more tolerant to latency, another configuration Y should be used. Such proactive preconfiguration information may be provided by the network (e.g., gNB) to the UE via a unicast or a broadcast message.

In another embodiment, more than one ODPS configuration or preconfiguration can be preconfigured per QoS level. This means that the UE can select one of those ODPS preconfigurations (e.g., in a case where multiple ODPS preconfigurations are preconfigured or indicated for a particular QoS class) depending on the further conditions/criteria besides the QoS class. These further conditions/criteria could be a measured radio condition, e.g., such as signal strength (RSSI, or RSRP), signal quality (e.g., RSRQ), measurements of beams/cells, e.g., depending on the CSI-RS (channel state information-reference signal) level or similar. Thus, in this case, a particular ODPS preconfiguration may be selected based on a combination of QoS class and a measured radio condition (where the gNB may provide preconfiguration indicating that an ODPS preconfiguration is associated with such combination of QoS class and radio condition).

In another embodiment, one or more ODPS preconfigurations may be further associated to a particular UE state, i.e., idle/inactive or connected state.

In one of the embodiments, UE may select one of the ODPS preconfigurations, and requests its activation and/or de-activation, e.g., by sending a request message that indicates the preconfiguration identifier associated with the selected ODPS preconfiguration.

In a further embodiment, UE indicates the selected ODPS preconfiguration to the network or gNB, when requesting ODPS (e.g., such as when UE requests transmission of an ODPS by gNB). In one embodiment, UE may indicate the selected ODPS preconfiguration to LMF by an LPP message. In another embodiment, UE indicates the selection (indicating the preconfiguration identifier of the selected ODPS preconfiguration) to gNB by a Layer 3 message, e.g., RRC message. To further reduce latency yet in another embodiment, Layer 2 signaling can be used, e.g., MAC (media access control) control element (CE). In further embodiments, examples can cover Layer 1 transmission, e.g., RACH (random access) preamble or any other alternative unicast signalling from UE to network.

In a further embodiment, UE requests the activation or deactivation or suspension of an ODPS preconfiguration from the network by referring the preconfiguration identifier or index. As noted above, the gNB may provide preconfiguration information to the UE for a plurality ODPS preconfigurations, e.g., including a preconfiguration identifier and a radio class and/or radio condition, for each of the ODPS preconfigurations.

In one of the embodiments, different ODPS preconfigurations may have different attributes in terms of ODPS bandwidth, ODPS periodicity, ODPS transmit power and directivity (i.e., wider beams with wider coverage vs narrower beams with longer range), and in terms of number of neighboring TRPs (transmission reception points, such as gNBs) which are triggered to transmit on-demand PS signal (such as PRS signals), configured depending on the QoS class/level, and/or radio condition, it corresponds to.

In another embodiment, ODPS preconfiguration may be determined per gNB, cell or beam. In another embodiment, it can be decided per the area that LMF is responsible for or for a geographical area. The decision can be made by the gNB in case of the former, or by LMF in any case. In case of LMF decision, the content may first be conveyed to the serving gNB.

In an embodiment, the network entities (e.g., gNBs and/or other nodes) might interact, or communicate, with each other in order to determine optimal ODPS preconfigurations, e.g., the serving gNB may inform the LMF about the cell or radio conditions that LMF might take into account when determining a configuration or preconfiguration. This includes signaling between gNBs and signaling between gNB and LMF.

In one of the embodiments, the set ODPS preconfigurations may be modified by the network. The network can signal the delta configuration (an amount to change a current configuration, or preconfiguration), or configure a new set. This re-configuration process could be initiated by the UE or by the network (e.g., gNB or LMF), and the new configuration could be signalled to the UE by the network, e.g., via RRC or LPP.

Figure 2:
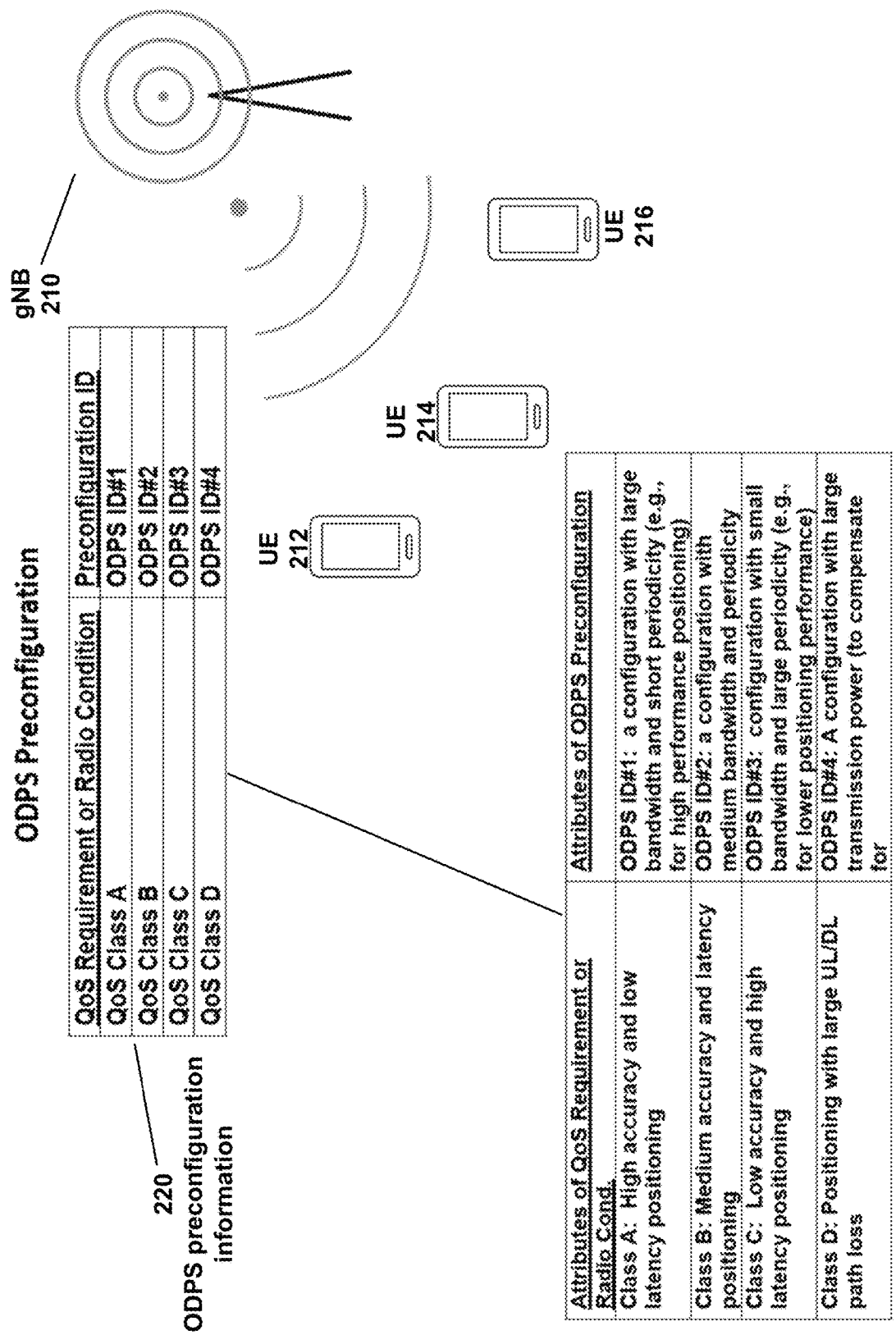
FIG. 2 is a diagram illustrating a gNB communicating information of a plurality of downlink on-demand positioning signals preconfigurations according to an example embodiment.

FIG. 2 is a diagram illustrating a gNB communicating information of a plurality of downlink on-demand positioning signals (ODPS signals, such as DL PRS signals) preconfigurations according to an example embodiment. gNB 210 may transmit to UEs 212, 214 and 216, information (e.g., ODPS preconfiguration information) 220, that may include information of a plurality ODPS preconfigurations that are supported by gNB 210, including a preconfiguration identifier (e.g., ODPS ID #1, ODPS ID #2, ODPS ID #3) and at least one of a QoS requirement (e.g., QoS class A, QoS class B, QoS class C, QoS class D) and/or a radio condition associated with each of the ODPS preconfigurations. Preconfiguration information 220 may indicate, for example, that ODPS ID #1 is associated with QoS class A for a first ODPS preconfiguration, ODPS ID #2 is associated with QoS class B for a second ODPS preconfiguration, and ODPS ID #3 is associated with QoS class C for a third ODPS preconfiguration, and ODPS ID #4 is associated with QoS class 4. Classes A, B C and D are examples of a QoS requirement(s). This is an illustrative example, and other classes and/or preconfigurations may be possible, and may be indicated.

For example, as shown by the preconfiguration information 220:

1) a first ODPS preconfiguration is associated with QoS class A (which includes a high accuracy and low latency positioning) and is associated with ODPS ID #1, and has a configuration with a large ODPS bandwidth and short periodicity (to provide higher positioning performance);

2) a second ODPS preconfiguration is associated with QoS class B (which includes a medium accuracy and medium latency positioning) and is associated with ODPS ID #2, and has a configuration with a medium ODPS bandwidth and medium periodicity;

3) a third ODPS preconfiguration is associated with QoS class C (which includes a low accuracy and high latency positioning), and is associated with ODPS ID #3, and has a configuration (or preconfiguration) with a small ODPS bandwidth and a large periodicity which uses fewer resources but provides lower positioning performance; and 4) a fourth ODPS preconfiguration is associated with QoS class D or radio condition (which may include a large uplink/downlink (UL/DL) path loss between UE and gNB, and is associated with ODPS ID #4, and has a configuration/preconfiguration with a large ODPS transmission power, e.g., to compensate for the large UL/DL path loss between UE and gNB.

Thus, as shown in FIG. 2, different preconfigurations are provided, each having an associated QOS class or radio condition, a ODPS ID #, and a configuration (or preconfiguration) (which may include or may have ODPS signal attributes) that is suited for or configured for the particular QoS class or radio condition (e.g., to allow the requested QoS class or QoS requirement to be provided for UE positioning).

Figure 3:
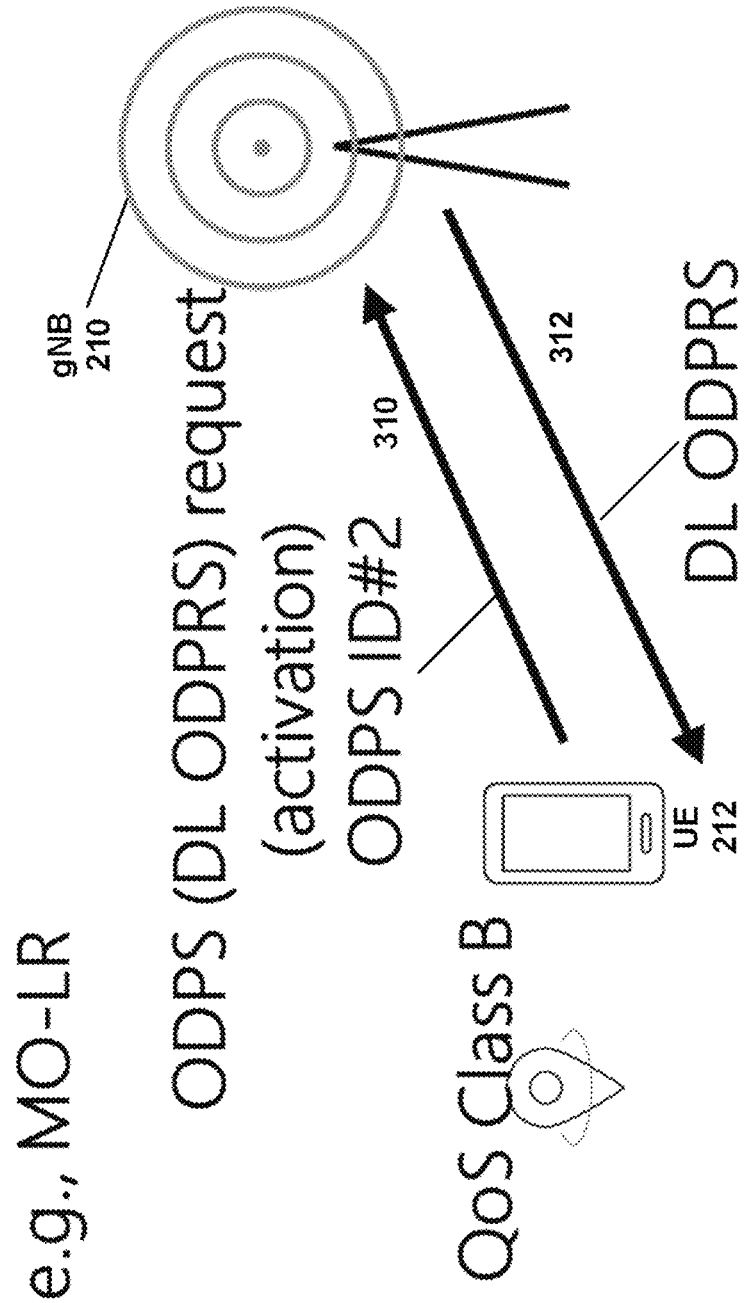
FIG. 3 is a diagram illustrating transmission of a selected on-demand positioning signal (ODPS) based on an ODPS preconfiguration according to an example embodiment.

FIG. 3 is a diagram illustrating transmission of a selected on-demand positioning signal (ODPS) based on an ODPS preconfiguration according to an example embodiment. A UE 212 may be in communication with gNB 210. gNB 210 may have previously sent preconfiguration information to the UE 212, which may include a preconfiguration identifier and a QoS class associated with each of a plurality of ODPS preconfigurations (e.g., see FIG. 2). In, this example, the ODPS signals may be DL positioning reference signals (PRS signals). Based on a QoS class of a positioning session for the UE 212 (in this case, QoS class B) determined by the UE 212, the UE 212 may select one of the ODPS preconfigurations, having ODPS ID #2 as a preconfiguration identifier. At 310, the UE 212 may send an ODPS (or ODPRS) request for positioning reference signals (PRS signals) to gNB 210, e.g., by indicating the preconfiguration identifier (ODPS ID #2) of the selected ODPS preconfiguration. gNB 210 may receive the ODPS request, including the preconfiguration identifier. At 312, gNB 210 may (based on the received request) transmit an ODPS signal (e.g., which in this case may be a DL PRS signal), with a configuration (or preconfiguration) that is based on (or which matches) the received preconfiguration identifier. Thus, in FIG. 3, the gNB 210 transmits (312) to UE 212 an ODPS having a preconfiguration or configuration that is indicated by the request (310).

Figure 4:
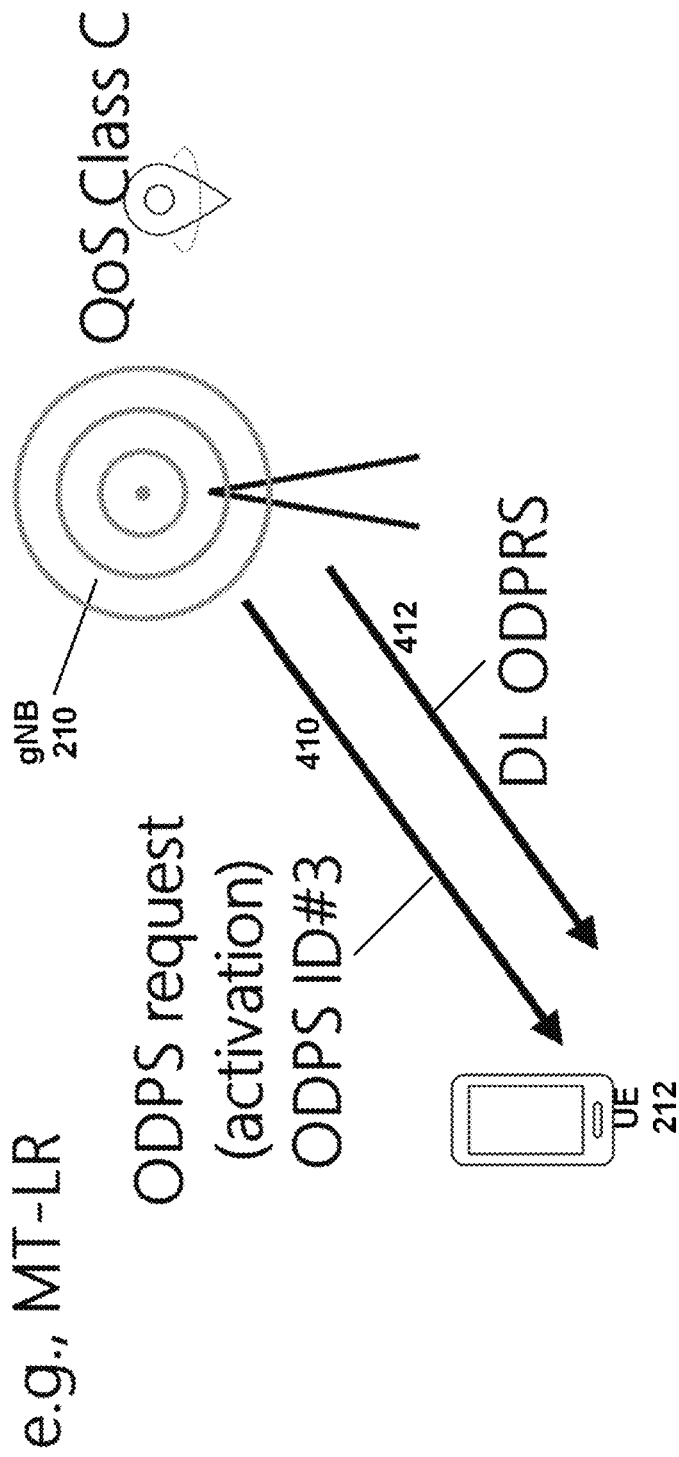
FIG. 4 is a diagram illustrating transmission of a selected on-demand positioning signal (ODPS) based on an ODPS preconfiguration according to an example embodiment.

FIG. 4 is a diagram illustrating transmission of a selected on-demand positioning signal (ODPS) based on an ODPS preconfiguration according to an example embodiment. gNB 210 may have previously sent preconfiguration information to the UE 212, which may include a preconfiguration identifier and a QoS class associated with each of a plurality of ODPS preconfigurations (e.g., see FIG. 2). In, this example, the ODPS signals may be DL positioning reference signals (PRS signals). Based on a QoS class of a positioning session for the UE 212 (in this case, QoS class C) determined by the gNB 210 the gNB 210 may select one of the ODPS preconfigurations, having ODPS ID #3 as a preconfiguration identifier. At 410, the gNB 210 may send an ODPS (or ODPRS) request for (or notification of transmission of) positioning reference signals (PRS signals) to UE 212 210, e.g., by indicating the preconfiguration identifier (ODPS ID #3) of the selected ODPS preconfiguration. In this example, the transmission at 410 of the ODPS ID #3 may operate as a notification by gNB 210 to UE 212 that an ODPS signal will be transmitted to UE with a preconfiguration associated with ODPS ID #3, and is a request for the UE 212 to measure signal parameter(s) of the received ODPS signal, as part of a UE positioning session or procedure to determine the position of UE 212. UE 212 may receive the ODPS request, including the preconfiguration identifier ODPS ID #3). At 412, UE 212 may (based on the received request) receive the indicated ODPS signal (e.g., which in this case may be a DL PRS signal), with a configuration (or preconfiguration) that is based on (or which matches, or is associated with) the received preconfiguration identifier (ODPS ID #3). Thus, in FIG. 4, the gNB 210 transmits (312) to UE 212 an ODPS having a preconfiguration or configuration that is indicated by the request (410) that was sent to the UE 212.

Figure 5:
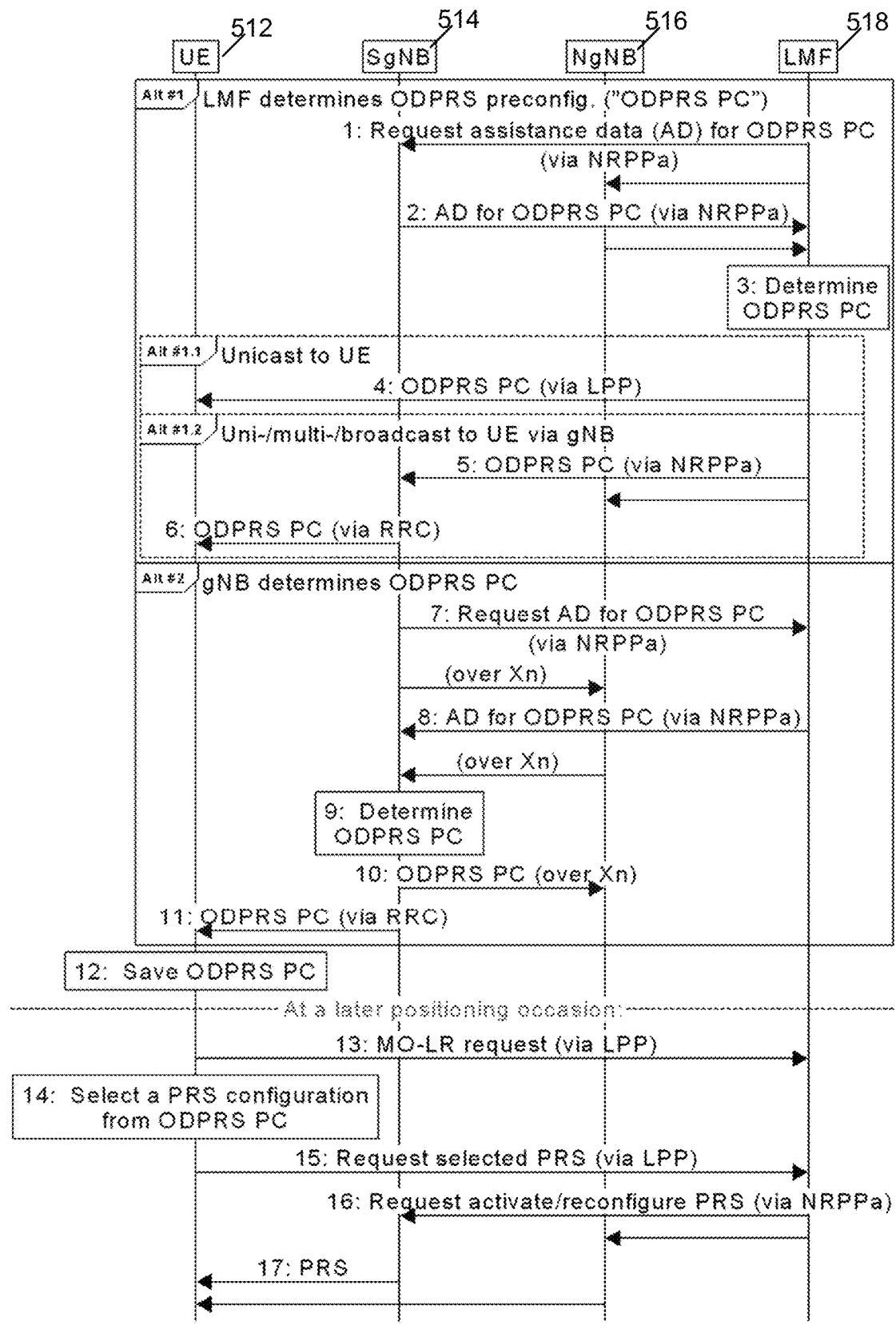
FIG. 5 is a flow chart illustrating on-demand positioning reference signals (ODPRS) preconfiguration, selection, and transmission according to an example embodiment.

FIG. 5 is a flow chart illustrating on-demand positioning reference signals (ODPRS) preconfiguration, selection, and transmission according to an example embodiment. In the flow chart of FIG. Downlink on-demand positioning reference signals (ODPRS signals) are preconfigured, requested, and then transmitted. The flow chart of FIG. 5 involves a UE 512, its serving gNB (SgNB) 514, the neighboring gNBs (NgNB) 516 and the LMF 518. The network decides on the ODPRS preconfiguration (referred to henceforth as "ODPRS PC"). The ODPRS preconfigurations (e.g., which ODPRS preconfigurations, and associated preconfiguration IDs and associated QoS class or radio condition for each of the ODPRS preconfigurations) may be determined either at the LMF (Alt. #1) or at the gNB (Alt. #2). At a later positioning occasion (or a later positioning session to obtain position of UE 512), when the UE 512 sends an on-demand PRS request, UE 512 then selects and indicates one of the PRS preconfigurations. The signaling in FIG. 2 focuses on the MO-LR scenario; it is applicable to both UE-based and UE-assisted positioning, as well as can be applied to MT-LR scenario.

If ODPRS preconfiguration information (ODPRS PC) is determined at the LMF 518 (Alt. #1):

1. LMF 518 requests assistance data (AD) from gNB(s), in order to determine ODPRS PC.

2. gNB(s) provide the requested AD for ODPRS PC to LMF 518.
   a. This data includes such as PRS preconfigurations that gNB s support, the radio conditions in a given cell, etc. to inform LMF 518 about the situation when determining ODPRS PC.

3. LMF 518 determines the ODPRS PC.
   a. Each ODPRS preconfiguration is further associated with one or more QoS requirements (or QoS classes), such that UEs may map their QoS values (or required QoS values for positioning session) to a corresponding ODPRS preconfiguration (e.g., ODPRS preconfiguration having a same or similar QoS class or requirement).

In case LMF provides the ODPRS PC to UE(s) directly (Alt. #1.1):

4. LMF 518 sends LPP message to the corresponding UE(s).

In case LMF provides the ODPRS PC to UE(s) via gNB (Alt. #1.2):

5. LMF 518 first sends the ODPRS PC to corresponding gNB(s) via NRPPa.

6. gNB sends the ODPRS PC to corresponding UEs, e.g., via RRC, unicast or broadcast using SIB.

If ODPRS PC (ODPRS preconfiguration) is determined at the gNB, e.g., having an LMF functionality (Alt. #2):

7. gNB requests AD from LMF 518 (via NRPPa) and/or neighboring gNB(s) (via Xn interface), in order to determine ODPRS PC.

8. LMF 518 and neighboring gNB(s) 516 provide the requested AD for ODPRS PC to the gNB 514.
   a. This data includes PRS configurations that other gNBs might support, radio conditions, UE measurements, etc.

9. gNB 514 determines the ODPRS PC (ODPRS preconfiguration information).

10. gNB 514 provides the determined PRS PC to the neighboring gNB(s) in case it also configured ODPRS PC of different gNB(s).

11. gNB sends the ODPRS PC to corresponding UEs, e.g., via RRC, unicast or broadcast using SIB.

12. The UE 512 stores the received ODPRS PC (ODPRS preconfiguration information).

Later at a stage when positioning occasion (positioning session) occurs:

13. UE 512 initiates a MO-LR request (intermediate steps are omitted).

14. UE selects a PRS preconfiguration from the ones indicated in the ODPRS PC, e.g., the one matching to its QoS requirements.
   a. Note that this step could also take place before Step 13.

15. UE 512 requests the selected PRS preconfiguration (e.g., requests transmission of PRS with indicated preconfiguration) from LMF 518
   a. The request could simply indicate the ID (ODPRS ID #) associated with the selected PRS preconfiguration.

16. LMF 518 sends a request to corresponding gNB(s) to activate or reconfigure their PRS to the requested one (intermediate steps, e.g., acknowledge from the gNBs, are omitted).

17. gNB(s) transmit the requested PRS.

The positioning session or occasion continues, e.g., with UE measurements using the requested and received PRS (later steps omitted).

Figure 6:
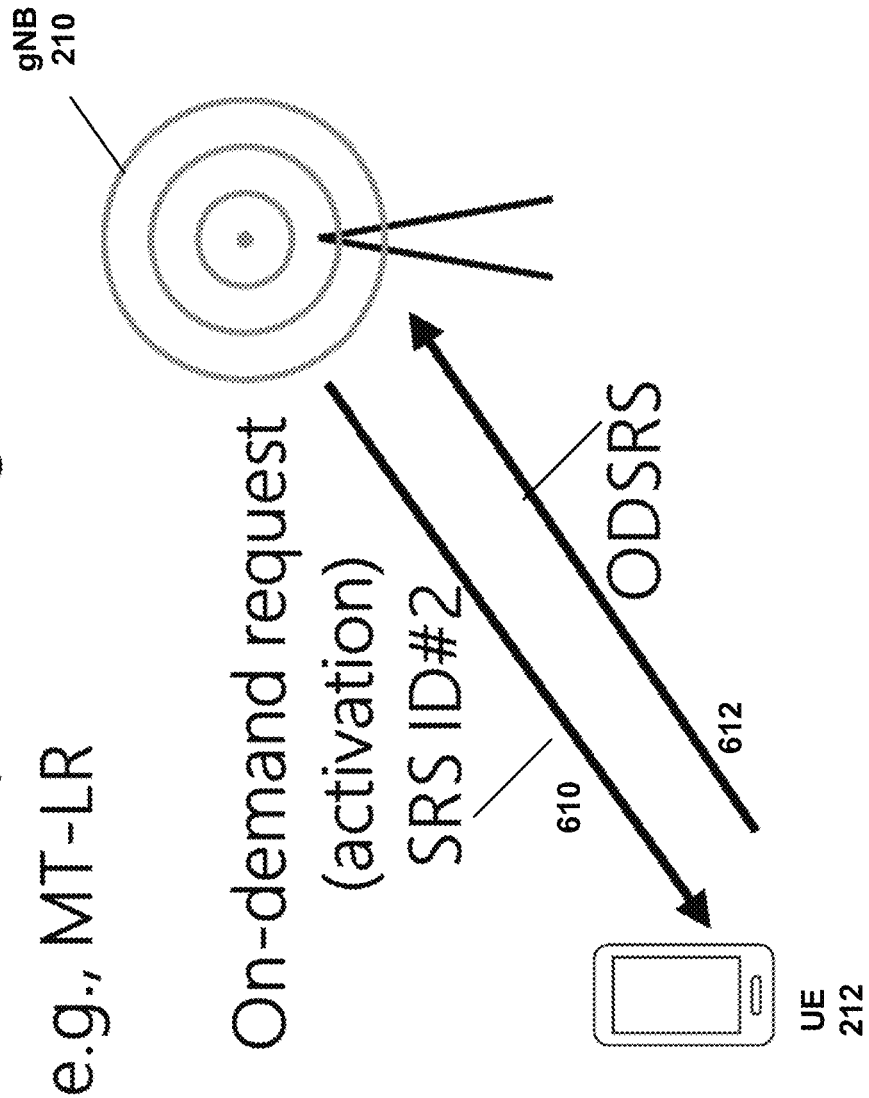
FIG. 6 is a diagram illustrating transmission of a selected on-demand positioning signal (ODPS) based on an ODPS preconfiguration according to an example embodiment.

FIG. 6 is a diagram illustrating transmission of a selected on-demand positioning signal (ODPS) based on an ODPS preconfiguration according to an example embodiment. In the example of FIG. 6, the ODPS may be an UL sounding reference signal (SRS) transmitted by UE 212 (or other UL positioning signal or reference signal). A UE 212 may be in communication with gNB 210. gNB 210 may have previously sent preconfiguration information to the UE 212, which may include a preconfiguration identifier and a QoS class associated with each of a plurality of ODSRS preconfigurations. Based on a QoS class of a positioning session for the UE 212 (in this case, QoS class B) determined by the gNB 210, the gNB 210 may select one of the ODSRS preconfigurations, having ODSRS ID #2 as a preconfiguration identifier. At 610, the gNB 210 may send an ODSRS request for sounding reference signals to UE 212, e.g., by indicating the preconfiguration identifier (OD SRS ID #2) of the selected ODSRS preconfiguration. UE 212 may receive the ODSRS signal transmission request, including the preconfiguration identifier. At 612, UE 212 may (based on the received request) transmit an SRS signal with a configuration (or preconfiguration) that is based on (or which matches) the received preconfiguration identifier. Thus, in FIG. 6 UE 212 transmits (612) to gNB 210 an ODSRS having a preconfiguration or configuration that is indicated by the request (610). Alternatively, UE 212 may send a preconfiguration identifier to one or more gNB s including a preconfiguration identifier of a selected ODSRS preconfiguration for a SRS signal that will be transmitted by the UE 212 to gNBs.

Figure 7:
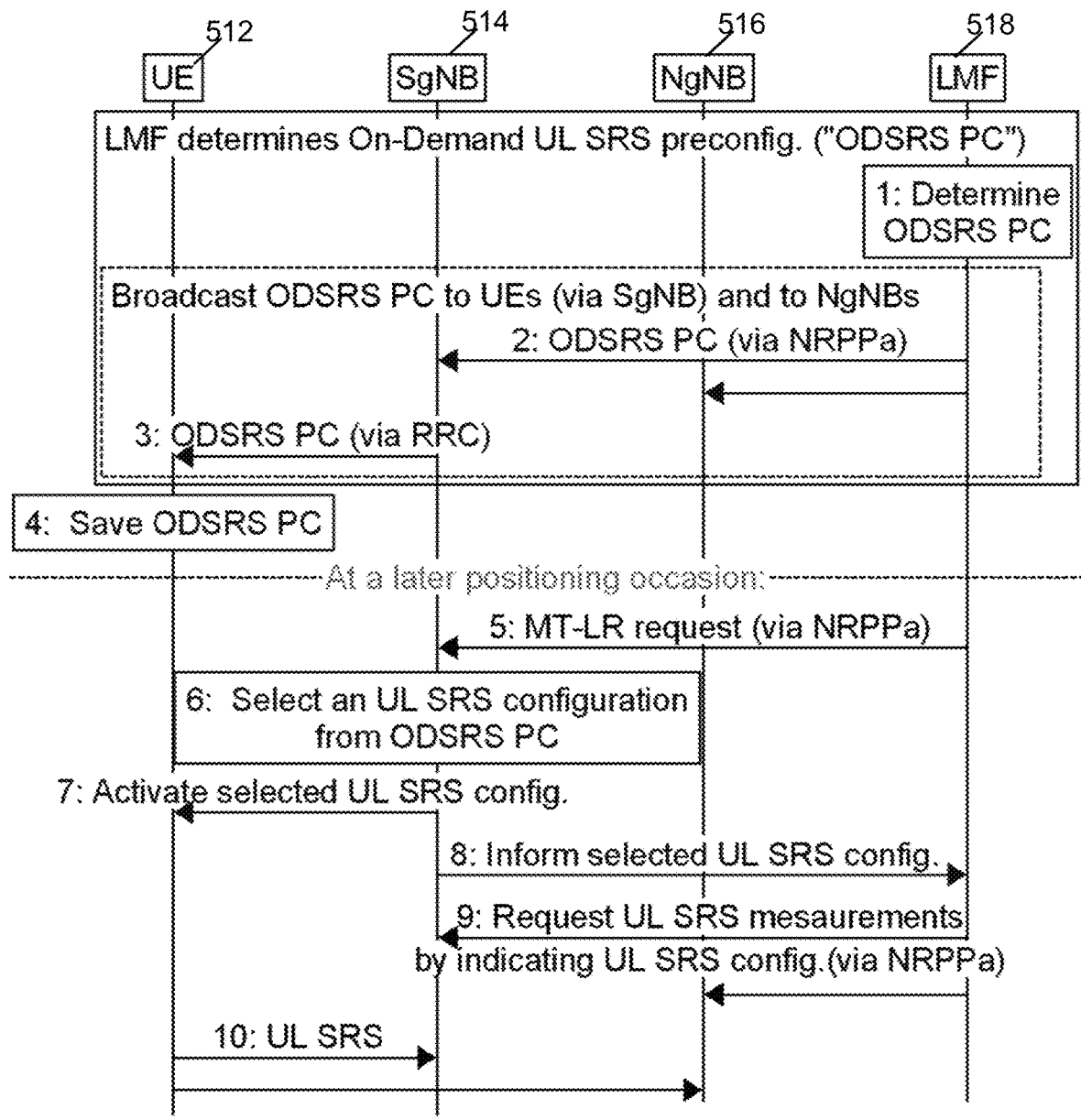
FIG. 7 is a flow chart illustrating on-demand sounding reference signals (ODSRS) preconfiguration, selection, and transmission according to an example embodiment.

FIG. 7 is a flow chart illustrating on-demand sounding reference signals (ODSRS) preconfiguration, selection, and transmission according to an example embodiment.

1. The LMF 518 may determine the ODSRS preconfiguration information (ODSRS PC) (e.g., which may include preconfiguration identifiers and associated QoS class or radio condition for each of the ODSRS preconfigurations.

2. LMF 518 communicates or transmits the ODSRS PC to gNBs 514, 516.

3. SgNB 514 may transmit the ODSRS PC to UE 512, e.g., via RRC message, or MAC CE, etc.

4. UE 512 saves the ODSRS PC.

5. LMF 518 sends a location or positioning request to SgNB 514 for UE 512.

6. SgNB 514, which may be aware of a QoS of positioning request/positioning session or radio condition, selects one of the ODSRS preconfigurations, e.g., based on a QoS class associated with the positioning session, or based on a radio condition. E.g., the ODSRS preconfiguration having a same or most closely matching QoS class may be selected.

7. SgNB 514 sends to UE 512 a request or activation message, indicating the selected ODSRS preconfiguration, to request UE 512 to transmit a SRS with the indicated preconfiguration.

8-9. LMF is notified of the configured ODSRS preconfiguration for the UE, and LMF 518 requests the gNB to forward SRS signal measurements, which may be used to determine a position of UE 512.

10. UE 512 transmits the UL SRS having a configuration as indicated by the received preconfiguration identifier.

Figure 8:
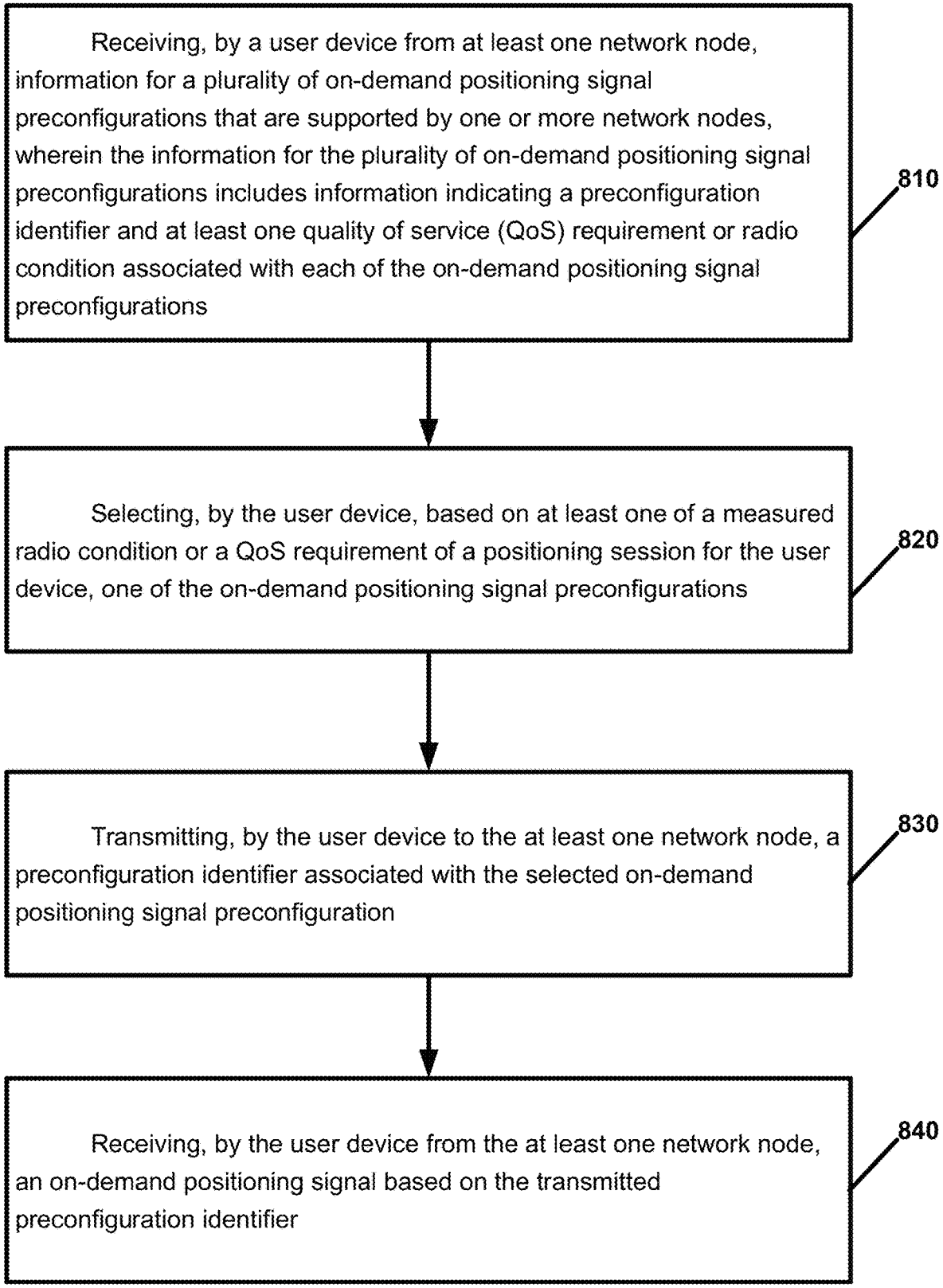
FIG. 8 is a flow chart illustrating operation of a user device (or UE) according to an example embodiment.

Some further examples will be described:

Example 1. FIG. 8 is a flow chart illustrating operation of a user device (or UE) according to an example embodiment. Operation 810 includes receiving, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations. Operation 820 includes selecting, by the user device, based on at least one of a measured radio condition or a QoS requirement of a positioning session for the user device, one of the on-demand positioning signal preconfigurations. Operation 830 includes transmitting, by the user device to the at least one network node, a preconfiguration identifier associated with the selected on-demand positioning signal preconfiguration. Operation 840 includes receiving, by the user device from the at least one network node, an on-demand positioning signal based on the transmitted preconfiguration identifier.

Example 2. The method of Example 1, wherein the positioning session for the user device comprises a positioning session to obtain and/or provide a signal measurement of the received on-demand positioning signal, for use by either the user device, the network node or a location management function in estimating a position of the user device.

Example 3. The method of any of Examples 1-2: wherein the plurality of on-demand positioning signal preconfigurations comprise a plurality of on-demand positioning reference signal configurations that may be selected or requested, by the user device, for transmission; and wherein the receiving an on-demand positioning signal comprises receiving, by the user device from the at least one network node, including the first network node, an on-demand positioning reference signal based on the received preconfiguration identifier.

Example 4. The method of any of Examples 1-3, further comprising: measuring, as part of the positioning session to at least assist in determining a position of the user device, at least one signal parameter of the received on-demand positioning signal.

Example 5. The method of any of Examples 1-4, wherein the QoS requirement associated with the positioning session for the user device comprises at least one of: a positioning accuracy required by the positioning session; or a maximum latency required by the positioning session of an on-demand positioning signal; or a QoS class priority associated with a service priority of the positioning session.

Example 6. The method of any of Examples 1-5, wherein an on-demand positioning reference signal preconfiguration indicates or includes, at least one of following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

Example 7. The method of any of Examples 1-6: wherein the receiving information for a plurality of on-demand positioning signal preconfigurations comprises receiving, by the user device from each of a plurality of network nodes, information for a plurality of on-demand positioning signal preconfigurations that are supported by each network node, wherein the information for the plurality of on-demand positioning signal preconfigurations includes information indicating a preconfiguration identifier and at least one quality of service (QoS) requirement or radio condition associated with each of the on-demand positioning signal preconfigurations; and wherein the selecting comprises selecting, by the user device, based on at least one of a measured radio condition or a QoS requirement of a positioning session for the user device, one of the on-demand positioning signal preconfigurations for each of the plurality of network nodes.

Example 8. The method of Example 7, wherein: the transmitting comprises transmitting, by the user device to each of the plurality of network nodes, a preconfiguration identifier associated with the selected on-demand positioning signal preconfigurations that was selected for each of the network nodes; and wherein the receiving an on-demand positioning signal comprises receiving, by the user device from each of the plurality of network nodes, an on-demand positioning signal based on the preconfiguration identifier transmitted to each of the network nodes.

Example 9. The method of Example 8, further comprising: measuring, as part of the positioning session to at least assist in determining a position of the user device, at least one signal parameter of each of the received on-demand positioning signals.

Example 10. An apparatus comprising means for performing the method of any of Examples 1-9.

Example 11. A non-transitory computer-readable storage medium comprising instructions stored thereon that, when executed by at least one processor, are configured to cause a computing system to perform the method of any of Examples 1-9.

Example 12. An apparatus comprising: at least one processor; and at least one memory including computer program code; the at least one memory and the computer program code configured to, with the at least one processor, cause the apparatus at least to perform the method of any of Examples 1-9.

Figure 9:
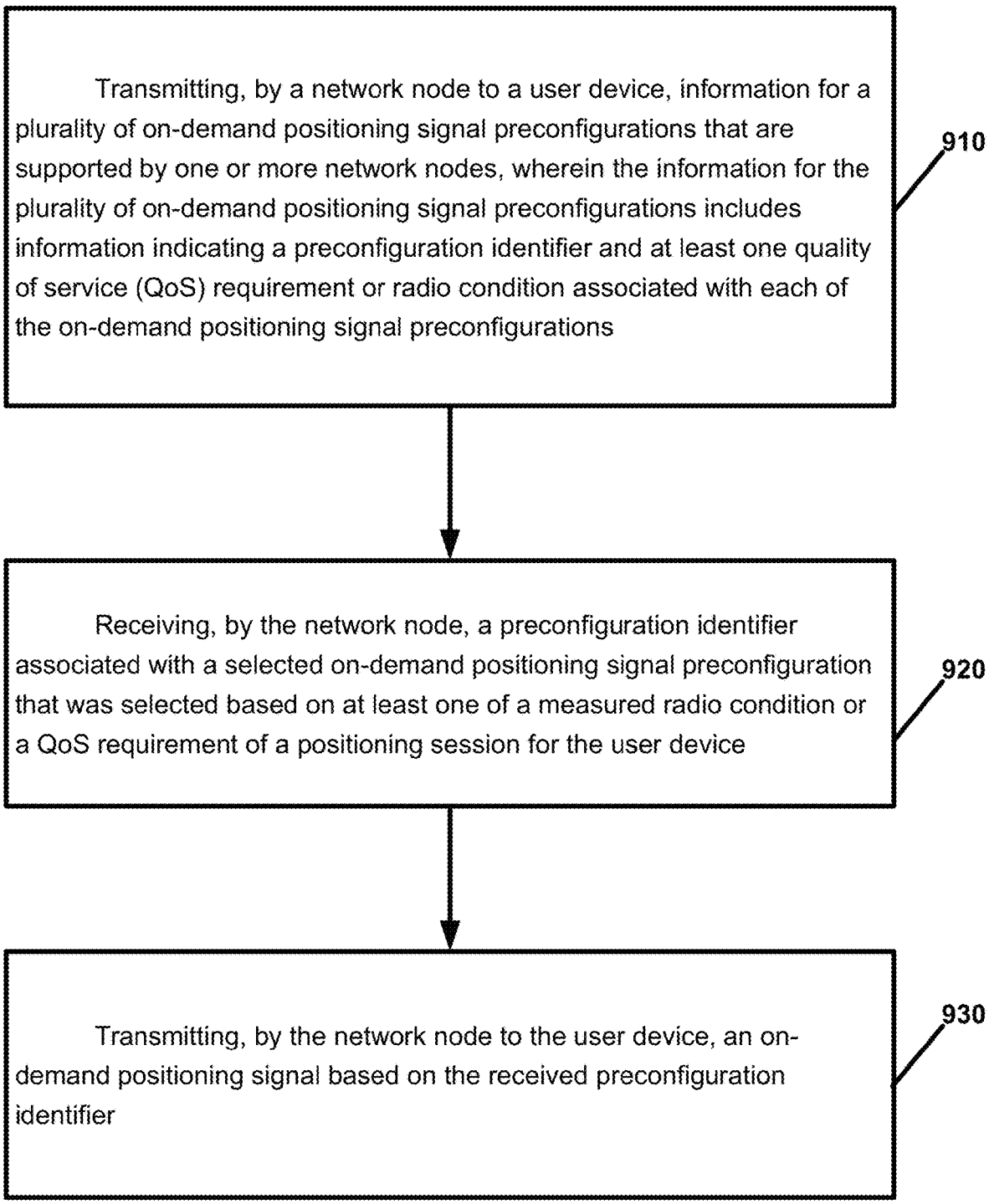
FIG. 9 is a flow chart illustrating operation of a network node according to an example embodiment.

Example 13. FIG. 9 is a flow chart illustrating operation of a network node according to an example embodiment. Operation 910 includes transmitting, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations. Operation 920 includes receiving, by the network node, a preconfiguration identifier associated with a selected on-demand positioning signal preconfiguration that was selected based on at least one of a measured radio condition or a QoS requirement of a positioning session for the user device. And, operation 930 includes transmitting, by the network node to the user device, an on-demand positioning signal based on the received preconfiguration identifier.

Example 14. The method of Example 13, wherein the positioning session for the user device comprises a positioning session to obtain and/or provide a signal measurement of the received on-demand positioning signal, for use by either the user device, the network node or a location management function in estimating a position of the user device.

Example 15. The method of any of Examples 13-14, wherein the plurality of on-demand positioning signal configurations comprise a plurality of on-demand positioning reference signal configurations for an on-demand positioning reference signal, which may be requested by the user device for transmission.

Example 16. The method of any of Examples 13-15, wherein the QoS requirement associated with the positioning session comprises at least one of: a positioning accuracy required by the positioning session; or a maximum latency required by the positioning session of an on-demand positioning signal; or a QoS class priority associated with a service priority of the positioning session with respect to other communication sessions.

Example 17. The method of any of Examples 13-16, wherein an on-demand positioning signal preconfiguration indicates or includes, at least one of following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

Example 18. An apparatus comprising means for performing the method of any of Examples 13-17.

Example 19. A non-transitory computer-readable storage medium comprising instructions stored thereon that, when executed by at least one processor, are configured to cause a computing system to perform the method of any of Examples 13-17.

Example 20. An apparatus comprising: at least one processor; and at least one memory including computer program code; the at least one memory and the computer program code configured to, with the at least one processor, cause the apparatus at least to perform the method of any of Examples 13-17.

Figure 10:
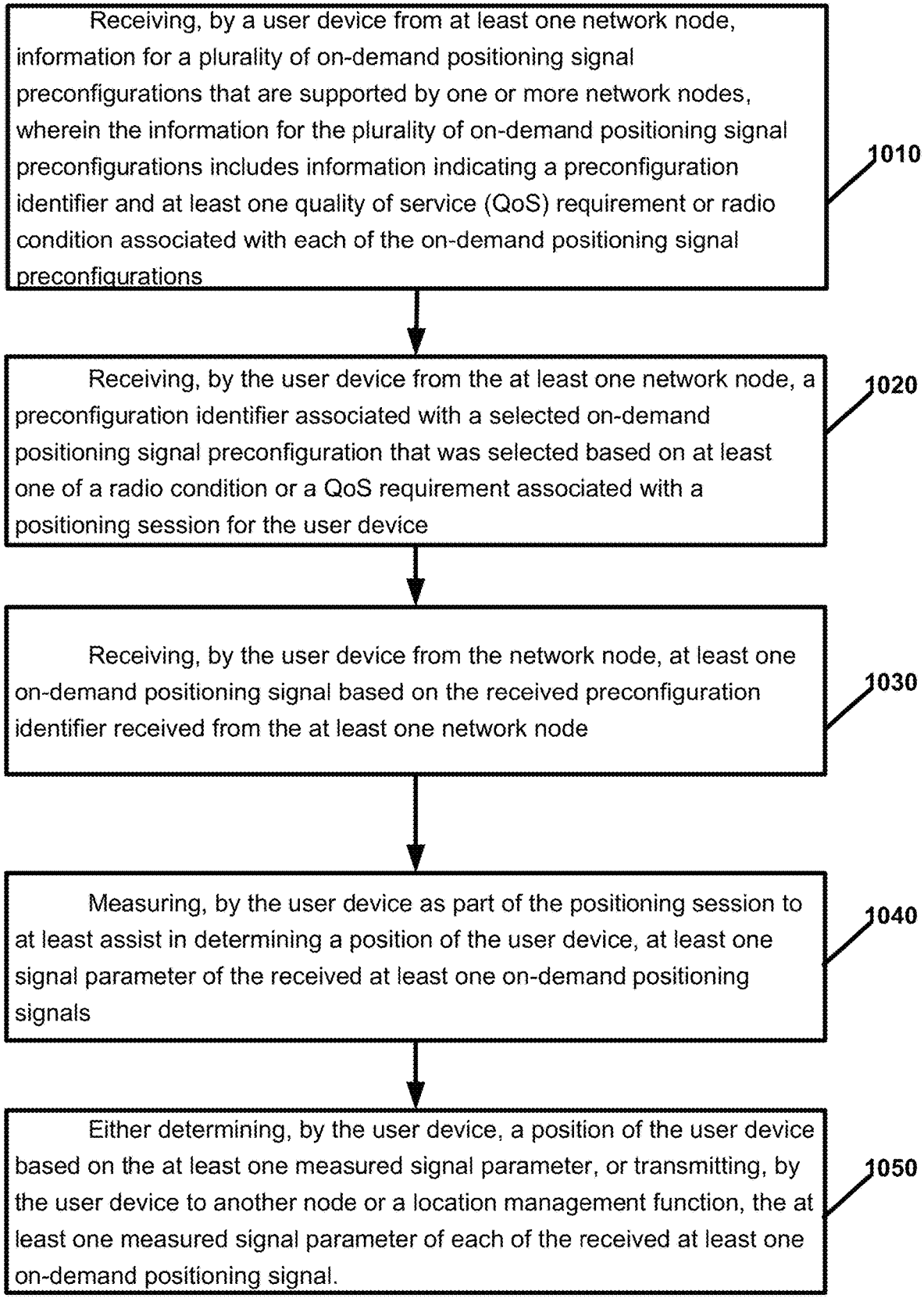
FIG. 10 is a flow chart illustrating operation of a user device according to another example embodiment.

Example 21. FIG. 10 is a flow chart illustrating operation of a user device according to another example embodiment. Operation 1010 includes receiving, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations. Operation 1020 includes receiving, by the user device from the at least one network node, a preconfiguration identifier associated with a selected on-demand positioning signal preconfiguration that was selected based on at least one of a radio condition or a QoS requirement associated with a positioning session for the user device. Operation 1030 includes receiving, by the user device from the network node, at least one on-demand positioning signal based on the received preconfiguration identifier received from the at least one network node. Operation 1040 includes measuring, by the user device as part of the positioning session to at least assist in determining a position of the user device, at least one signal parameter of the received at least one on-demand positioning signals. And, operation 1050 includes either determining, by the user device, a position of the user device based on the at least one measured signal parameter, or transmitting, by the user device to another node or a location management function, the at least one measured signal parameter of each of the received at least one on-demand positioning signal.

Example 22. The method of Example 21, wherein the positioning session for the user device comprises a positioning session to obtain and/or provide at least a signal measurement of an on-demand positioning signal for use by either the user device, the network node or a location management function, in estimating a position of the user device, based on an on-demand positioning signal preconfiguration that is selected by the network node or a location management function.

Example 23. The method of any of Examples 21-22: wherein the receiving a preconfiguration identifier comprises receiving, by the user device from each of a plurality of network nodes, a preconfiguration identifier associated with a selected on-demand positioning signal preconfiguration that was selected by the network node based on at least one of a radio condition or a QoS requirement associated with a positioning session for the user device; and wherein the receiving an on-demand positioning signal comprises receiving, by the user device from each of the plurality of network nodes, an on-demand positioning signal based on the preconfiguration identifier received from each of the plurality of network nodes.

Example 24. An apparatus comprising means for performing the method of any of Examples 21-23.

Example 25. A non-transitory computer-readable storage medium comprising instructions stored thereon that, when executed by at least one processor, are configured to cause a computing system to perform the method of any of Examples 21-24.

Figure 11:
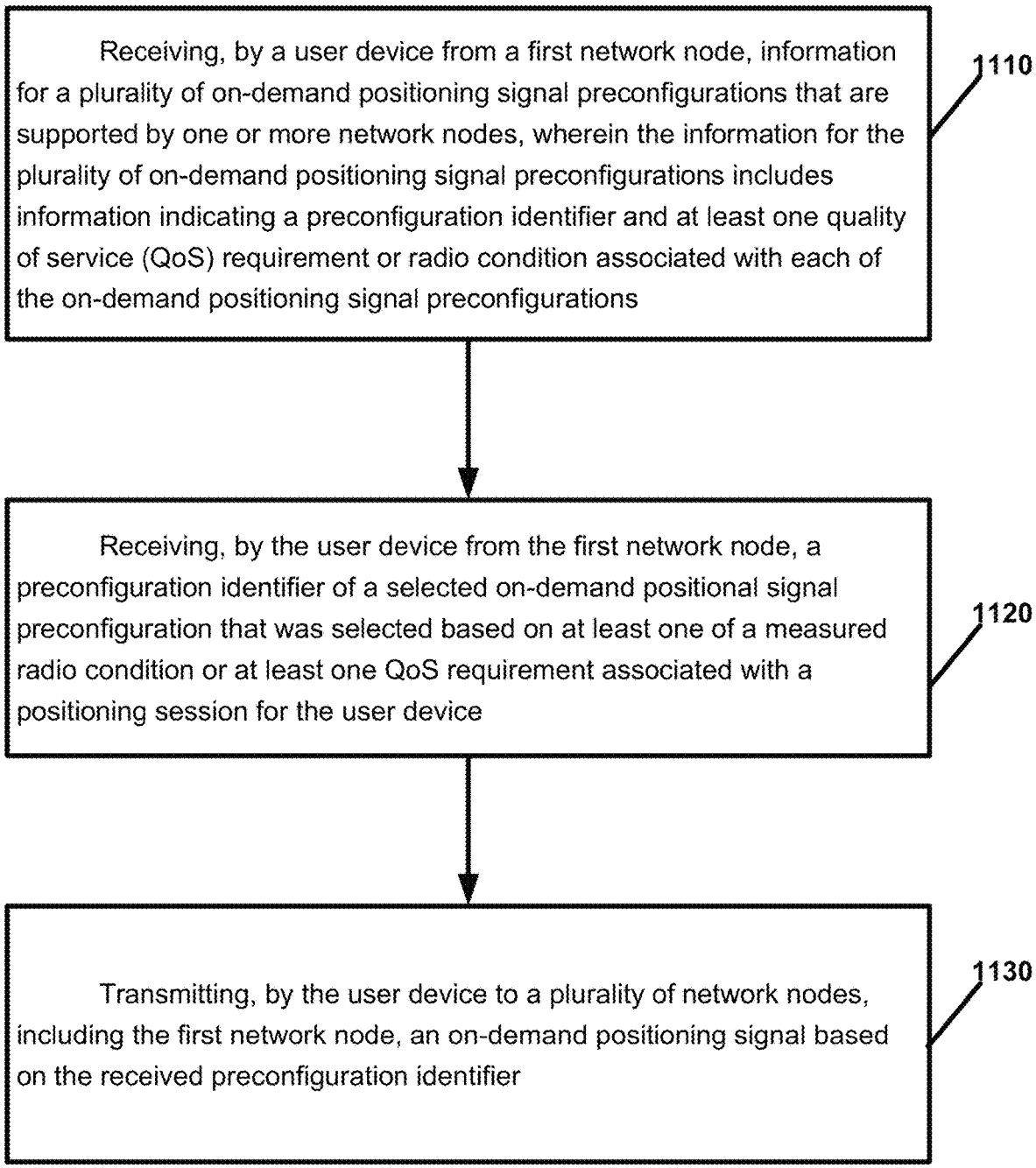
FIG. 11 is a flow chart illustrating operation of a user device according to another example embodiment.

Example 26. FIG. 11 is a flow chart illustrating operation of a user device according to another example embodiment. Operation 1110 includes receiving, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations. Operation 1120 includes receiving, by the user device from the first network node, a preconfiguration identifier of a selected on-demand positional signal preconfiguration that was selected based on at least one of a measured radio condition or at least one QoS requirement associated with a positioning session for the user device. And, operation 1130 includes transmitting, by the user device to a plurality of network nodes, including the first network node, an on-demand positioning signal based on the received preconfiguration identifier.

Example 27. The method of Example 26: wherein the plurality of on-demand positioning signal preconfigurations comprise a plurality of on-demand sounding reference signal preconfigurations; and wherein the transmitting comprises transmitting, by the user device to a plurality of network nodes, including the first network node, an on-demand sounding reference signal based on the received preconfiguration identifier.

Figure 12:
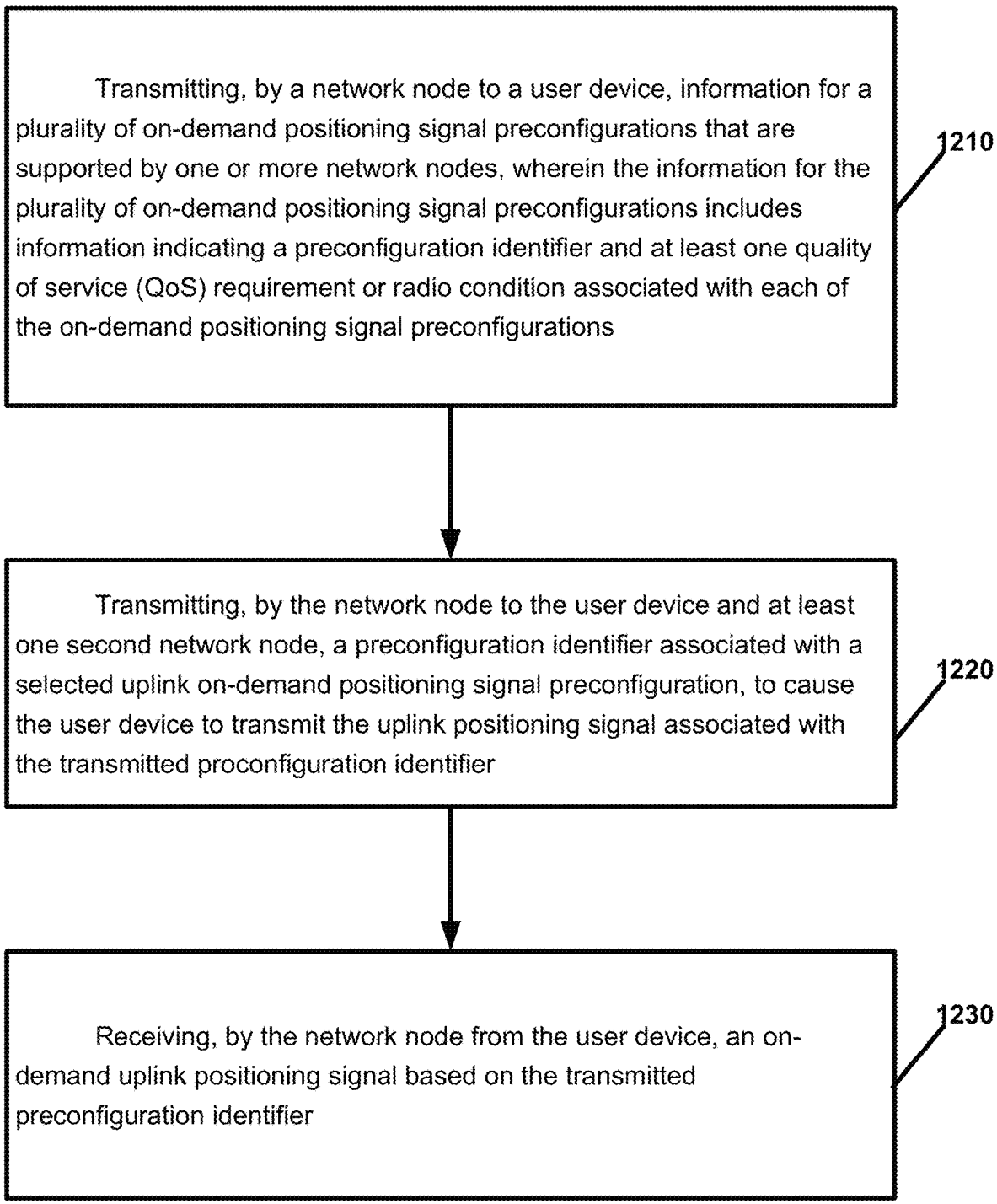
FIG. 12 is a flow chart illustrating operation of a user device according to another example embodiment.

Example 28. FIG. 12 is a flow chart illustrating operation of a user device according to another example embodiment. Operation 1210 includes transmitting, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations. Operation 1220 includes transmitting, by the network node to the user device and at least one second network node, a preconfiguration identifier associated with a selected uplink on-demand positioning signal preconfiguration, to cause the user device to transmit the uplink positioning signal associated with the transmitted preconfiguration identifier. And, operation 1230 include receiving, by the network node from the user device, an on-demand uplink positioning signal based on the transmitted preconfiguration identifier.

Example 29. The method of Example 28: wherein the plurality of on-demand positioning signal preconfigurations comprise a plurality of on-demand sounding reference signal preconfigurations; and wherein the receiving comprises receiving, by the network node from the user device, an on-demand sounding reference signal based on the transmitted preconfiguration identifier.

Example 30. The method of any of Examples 28-29, further comprising performing at least one of the following: selecting, by the network node based on at least one of a measured radio condition or a QoS requirement associated with a positioning session for the user device, the preconfiguration identifier of the selected on-demand uplink positioning signal preconfiguration; or receiving, by the network node, from either a location management function or another network node, based on at least one of a measured radio condition or a QoS requirement associated with a positioning session for the user device, the preconfiguration identifier of the selected on-demand uplink positioning signal preconfiguration.

Example 31. FIG. 13 is a flow chart illustrating operation of a user device according to an example embodiment. Operation 1310 includes receiving, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations. Operation 1320 includes selecting, by the user device, based on at least one of a measured radio condition or a QoS requirement of a positioning session for the user device, one of the on-demand positioning signal preconfigurations. Operation 1330 includes transmitting, by the user device to one or more network nodes, a preconfiguration identifier associated with the selected on-demand positioning signal preconfiguration. And, operation 1340 includes transmitting, by the user device to one or more network nodes, including the first network node, an on-demand positioning signal based on the received preconfiguration identifier.

Example 32. The Example of any of Examples 1-31, wherein the on-demand positioning signal comprises at least one of: an on-demand positioning reference signal; or an on-demand sounding reference signal.

Example 33. An apparatus comprising: means for receiving, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; means for selecting, by the user device, based on at least one of a measured radio condition or a QoS requirement of a positioning session for the user device, one of the on-demand positioning signal preconfigurations; means for transmitting, by the user device to the at least one network node, a preconfiguration identifier associated with the selected on-demand positioning signal preconfiguration; and means for receiving, by the user device from the at least one network node, an on-demand positioning signal based on the transmitted preconfiguration identifier.

Example 34. The apparatus of Example 33, wherein the positioning session for the user device comprises a positioning session to obtain and/or provide a signal measurement of the received on-demand positioning signal, for use by either the user device, the network node or a location management function in estimating a position of the user device.

Example 35. The apparatus of any of Examples 33-34, wherein the plurality of on-demand positioning signal preconfigurations comprise a plurality of on-demand positioning signal configurations that may be selected or requested, by the user device, for transmission; and wherein the means for receiving an on-demand positioning signal comprises means for receiving, by the user device from the at least one network node, including the first network node, an on-demand positioning reference signal based on the received preconfiguration identifier.

Example 36. The apparatus of any of Examples 33-35, further comprising: means for measuring, as part of the positioning session for the user device to at least assist in determining a position of the user device, at least one signal parameter of the received on-demand positioning signal.

Example 37. The apparatus of any of Examples 33-36, wherein the QoS requirement associated with the positioning session for the user device comprises at least one of: a positioning accuracy required by the positioning session; a maximum latency required by the positioning session of an on-demand positioning signal; or a QoS class priority associated with the service priority of the positioning session, or with respect to other communication sessions.

Example 38. The apparatus of any of Examples 33-37, wherein an on-demand positioning signal preconfiguration indicates or includes, at least one of the following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

Example 39. The apparatus of any of Examples 33-38, wherein the means for receiving information for a plurality of on-demand positioning signal preconfigurations comprises means for receiving, by the user device from each of a plurality of network nodes, information for a plurality of on-demand positioning signal preconfigurations that are supported by each network node, wherein the information for the plurality of on-demand positioning signal preconfigurations includes information indicating a preconfiguration identifier and at least one quality of service (QoS) requirement or radio condition associated with each of the on-demand positioning signal preconfigurations; and wherein the means for selecting comprises means for selecting, by the user device, based on at least one of a measured radio condition or a QoS requirement of a positioning session for the user device, one of the on-demand positioning signal preconfigurations for each of the plurality of network nodes.

Example 40. The apparatus of Example 39, wherein the means for transmitting comprises means for transmitting, by the user device to each of the plurality of network nodes, a preconfiguration identifier associated with the selected on-demand positioning signal preconfigurations that was selected for each of the network nodes; and wherein the means for receiving an on-demand positioning signal comprises means for receiving, by the user device from each of the plurality of network nodes, an on-demand positioning signal based on the preconfiguration identifier transmitted to each of the network nodes.

Example 41. The apparatus of Example 40, further comprising: means for measuring, as part of the positioning session to at least assist in determining a position of the user device, at least one signal parameter of each of the received on-demand positioning signals.

Example 42. The apparatus of any of Examples 33-41, wherein the on-demand positioning signal comprises an on-demand positioning reference signal.

Example 43. An apparatus comprising: means for transmitting, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; means for receiving, by the network node, a preconfiguration identifier associated with a selected on-demand positioning signal preconfiguration that was selected based on at least one of a measured radio condition or a QoS requirement of a positioning session for the user device; and means for transmitting, by the network node to the user device, an on-demand positioning signal based on the received preconfiguration identifier.

Example 44. The apparatus of Example 43, wherein the positioning session for the user device comprises a positioning session to obtain and/or provide a signal measurement of the received on-demand positioning signal, for use by either the user device, the network node or a location management function in estimating a position of the user device.

Example 45. The apparatus of any of Examples 43-44, wherein the plurality of on-demand positioning signal configurations comprise a plurality of on-demand positioning reference signal configurations for an on-demand positioning reference signal, which may be requested by the user device for transmission.

Example 46. The apparatus of any of Examples 43-45, wherein the QoS requirement associated with the positioning session comprises at least one of: a positioning accuracy required by the positioning session; a maximum latency required by the positioning session of an on-demand positioning signal; or a QoS class priority associated with the service priority of the positioning session, for example with respect to other communication sessions.

Example 47. The apparatus of any of Examples 43-46, wherein an on-demand positioning signal preconfiguration indicates or includes, at least one of the following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

Example 48. The apparatus of any of Examples 43-47, wherein the on-demand positioning signal comprises an on-demand positioning reference signal.

Example 49. An apparatus comprising: means for receiving, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; means for receiving, by the user device from the at least one network node, a preconfiguration identifier associated with a selected on-demand positioning signal preconfiguration that was selected based on at least one of a radio condition or a QoS requirement associated with a positioning session for the user device; means for receiving, by the user device from the network node, at least one on-demand positioning signal based on the received preconfiguration identifier received from the at least one network node; means for measuring, by the user device as part of the positioning session to at least assist in determining a position of the user device, at least one signal parameter of the received at least one on-demand positioning signals; and means for either determining, by the user device, a position of the user device based on the at least one measured signal parameter, or transmitting, by the user device to another node or a location management function, the at least one measured signal parameter of each of the received at least one on-demand positioning signal.

Example 50. The apparatus of Example 49, wherein the positioning session for the user device comprises a positioning session for the user device to obtain and/or provide at least a signal measurement of an on-demand positioning signal for use by either the user device, the network node or a location management function, in estimating a position of the user device, based on an on-demand positioning signal preconfiguration that is selected by the network node or a location management function.

Example 51. The apparatus of any of Examples 49-50, wherein the means for receiving a preconfiguration identifier comprises means for receiving, by the user device from each of a plurality of network nodes, a preconfiguration identifier associated with a selected on-demand positioning signal preconfiguration that was selected by the network node based on at least one of a radio condition or a QoS requirement associated with a positioning session for the user device; and wherein the means for receiving an on-demand positioning signal comprises means for receiving, by the user device from each of the plurality of network nodes, an on-demand positioning signal based on the preconfiguration identifier received from each of the plurality of network nodes.

Example 52. The apparatus of any of Examples 49-51, wherein the on-demand positioning signal comprises an on-demand positioning reference signal.

Example 53. An apparatus comprising: means for receiving, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; means for receiving, by the user device from the first network node, a preconfiguration identifier of a selected on-demand positional signal preconfiguration that was selected based on at least one of a measured radio condition or at least one QoS requirement associated with a positioning session for the user device; and means for transmitting, by the user device to a plurality of network nodes, including the first network node, an on-demand positioning signal based on the received preconfiguration identifier.

Example 54. The apparatus of Example 53, wherein the plurality of on-demand positioning signal preconfigurations comprise a plurality of on-demand sounding reference signal preconfigurations; and wherein the means for transmitting comprises means for transmitting, by the user device to a plurality of network nodes, including the first network node, an on-demand sounding reference signal based on the received preconfiguration identifier.

Example 55. The apparatus of any of Examples 53-54, wherein the on-demand positioning signal comprises an on-demand sounding reference signal.

Example 56. An apparatus comprising: means for receiving, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; means for selecting, by the user device, based on at least one of a measured radio condition or a QoS requirement of a positioning session for the user device, one of the on-demand positioning signal preconfigurations; means for transmitting, by the user device to one or more network nodes, a preconfiguration identifier associated with the selected on-demand positioning signal preconfiguration; and means for transmitting, by the user device to one or more network nodes, including the first network node, an on-demand positioning signal based on the received preconfiguration identifier.

Example 57. The apparatus of Example 56, wherein the on-demand positioning signal comprises an on-demand sounding reference signal.

Example 58. An apparatus comprising: means for transmitting, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; means for transmitting, by the network node to the user device and at least one second network node, a preconfiguration identifier associated with a selected uplink on-demand positioning signal preconfiguration, to cause the user device to transmit the uplink positioning signal associated with the transmitted preconfiguration identifier; and means for receiving, by the network node from the user device, an on-demand uplink positioning signal based on the transmitted preconfiguration identifier.

Example 59. The apparatus of Example 58, wherein the plurality of on-demand positioning signal preconfigurations comprise a plurality of on-demand sounding reference signal preconfigurations; and wherein the means for receiving comprises receiving, by the network node from the user device, an on-demand sounding reference signal based on the transmitted preconfiguration identifier.

Example 60. The apparatus of any of Examples 58-59, further comprising means for performing at least one of the following: selecting, by the network node based on at least one of a measured radio condition or a QoS requirement associated with a positioning session for the user device, the preconfiguration identifier of the selected on-demand uplink positioning signal preconfiguration; or receiving, by the network node, from either a location management function or another network node, based on at least one of a measured radio condition or a QoS requirement associated with a positioning session for the user device, the preconfiguration identifier of the selected on-demand uplink positioning signal preconfiguration.

Example 61. The apparatus of any of Examples 58-60, wherein the on-demand positioning signal comprises an on-demand sounding reference signal.

Example 62. An apparatus comprising: at least one processor; and at least one memory including computer program code; the at least one memory and the computer program code configured to, with the at least one processor, cause the apparatus at least to: receive, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; select, by the user device, based on at least one of a measured radio condition or a QoS requirement of a positioning session for the user device, one of the on-demand positioning signal preconfigurations; transmit, by the user device to the at least one network node, a preconfiguration identifier associated with the selected on-demand positioning signal preconfiguration; and receive, by the user device from the at least one network node, an on-demand positioning signal based on the transmitted preconfiguration identifier.

Example 63. The apparatus of Example 62 wherein the positioning session for the user device comprises a positioning session to obtain and/or provide a signal measurement of the received on-demand positioning signal, for use by either the user device, the network node or a location management function in estimating a position of the user device.

Example 64. The apparatus of any of Examples 62-63: wherein the plurality of on-demand positioning signal preconfigurations comprise a plurality of on-demand positioning signal configurations that may be selected or requested, by the user device, for transmission; and wherein the computer program code configured to, with the at least one processor, cause the apparatus to receive an on-demand positioning signal comprises the computer program code configured to, with the at least one processor, cause the apparatus to receive, by the user device from the at least one network node, including the first network node, an on-demand positioning reference signal based on the received preconfiguration identifier.

Example 65. The apparatus of any of Examples 62-64, further comprising: the computer program code configured to, with the at least one processor, cause the apparatus to measure, as part of the positioning session to at least assist in determining a position of the user device, at least one signal parameter of the received on-demand positioning signal.

Example 66. The apparatus of any of Examples 62-65, wherein the QoS requirement associated with the positioning session for the user device comprises at least one of: a positioning accuracy required by the positioning session; or a maximum latency required by the positioning session of an on-demand positioning signal; or a QoS class priority associated with a service priority of the positioning session with respect to other communication sessions.

Example 67. The apparatus of any of Examples 62-66, wherein an on-demand positioning reference signal preconfiguration indicates or includes, at least one of following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

Example 68. The apparatus of any of Examples 62-67: wherein the computer program code configured to, with the at least one processor, cause the apparatus to receive information for a plurality of on-demand positioning signal preconfigurations comprises the computer program code configured to, with the at least one processor, cause the apparatus to receive, by the user device from each of a plurality of network nodes, information for a plurality of on-demand positioning signal preconfigurations that are supported by each network node, wherein the information for the plurality of on-demand positioning signal preconfigurations includes information indicating a preconfiguration identifier and at least one quality of service (QoS) requirement or radio condition associated with each of the on-demand positioning signal preconfigurations; and wherein the computer program code configured to, with the at least one processor, cause the apparatus to select comprises the computer program code configured to, with the at least one processor, cause the apparatus to select, by the user device, based on at least one of a measured radio condition or a QoS requirement of a positioning session for the user device, one of the on-demand positioning signal preconfiguration for each of the plurality of network nodes.

Example 69. The apparatus of Example 68, wherein: the computer program code configured to, with the at least one processor, cause the apparatus to transmit comprises the computer program code configured to, with the at least one processor, cause the apparatus to transmit, by the user device to each of the plurality of network nodes, a preconfiguration identifier associated with the selected on-demand positioning signal preconfiguration that was selected for each of the network nodes; and wherein the computer program code configured to, with the at least one processor, cause the apparatus to receive an on-demand positioning signal comprises the computer program code configured to, with the at least one processor, cause the apparatus to receive, by the user device from each of the plurality of network nodes, an on-demand positioning signal based on the preconfiguration identifier transmitted to each of the network nodes.

Example 70. The apparatus of Example 69, further comprising: the computer program code configured to, with the at least one processor, cause the apparatus to measure, as part of the positioning session for the user device to at least assist in determining a position of the user device, at least one signal parameter of each of the received on-demand positioning signals.

Example 71. The apparatus of any of Examples 62-70, wherein the on-demand positioning signal comprises an on-demand positioning reference signal.

Example 72. An apparatus comprising: at least one processor; and at least one memory including computer program code; the at least one memory and the computer program code configured to, with the at least one processor, cause the apparatus at least to: transmit, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; receive, by the network node, a preconfiguration identifier associated with a selected on-demand positioning signal preconfiguration that was selected based on at least one of a measured radio condition or a QoS requirement of a positioning session for the user device; and transmit, by the network node to the user device, an on-demand positioning signal based on the received preconfiguration identifier.

Example 73. The apparatus of Example 72, wherein the positioning session for the user device comprises a positioning session to obtain and/or provide a signal measurement of the received on-demand positioning signal, for use by either the user device, the network node or a location management function in estimating a position of the user device.

Example 74. The apparatus of any of Examples 72-73, wherein the plurality of on-demand positioning signal configurations comprise a plurality of on-demand positioning reference signal configurations for an on-demand positioning reference signal, which is requested by the user device for transmission.

Example 75. The apparatus of any of Examples 72-74, wherein the QoS requirement associated with the positioning session for the user device comprises at least one of: a positioning accuracy required by the positioning session; a maximum latency required by the positioning session of an on-demand positioning signal; or a QoS class priority associated with a service priority of the positioning session with respect to other communication sessions.

Example 76 The apparatus of any of Examples 72-75, wherein an on-demand positioning signal preconfiguration indicates or includes, at least one of following positioning signal attributes: a positioning signal bandwidth; a positioning signal periodicity; a positioning signal transmission power; time and frequency resources of the positioning signal; one or more spatial parameters of the positioning signal; and/or a directivity or beam width or beam shape used for transmission of the positioning signal.

Example 77. The apparatus of any of Examples 72-76, wherein the on-demand positioning signal comprises an on-demand positioning reference signal.

Example 78. An apparatus comprising: at least one processor; and at least one memory including computer program code; the at least one memory and the computer program code configured to, with the at least one processor, cause the apparatus at least to: receive, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; receive, by the user device from the at least one network node, a preconfiguration identifier associated with a selected on-demand positioning signal preconfiguration that was selected based on at least one of a radio condition or a QoS requirement associated with a positioning session for the user device; receive, by the user device from the network node, at least one on-demand positioning signal based on the received preconfiguration identifier received from the at least one network node; measure, by the user device as part of the positioning session to at least assist in determining a position of the user device, at least one signal parameter of the received at least one on-demand positioning signals; and either determine, by the user device, a position of the user device based on the at least one measured signal parameter, or transmit, by the user device to another node or a location management function, the at least one measured signal parameter of each of the received at least one on-demand positioning signal.

Example 79. The apparatus of Example 78, wherein the positioning session for the user device comprises a positioning session to obtain and/or provide at least a signal measurement of an on-demand positioning signal for use by either the user device, the network node or a location management function, in estimating a position of the user device, based on an on-demand positioning signal preconfiguration that is selected by the network node or a location management function.

Example 80. The apparatus of any of Examples 78-79: wherein the computer program code configured to, with the at least one processor, cause the apparatus to receive a preconfiguration identifier comprises the computer program code configured to, with the at least one processor, cause the apparatus to receive, by the user device from each of a plurality of network nodes, a preconfiguration identifier associated with a selected on-demand positioning signal preconfiguration that was selected by the network node based on at least one of a radio condition or a QoS requirement associated with a positioning session for the user device; and wherein the computer program code configured to, with the at least one processor, cause the apparatus to receive an on-demand positioning signal comprises the computer program code configured to, with the at least one processor, cause the apparatus to receive, by the user device from each of the plurality of network nodes, an on-demand positioning signal based on the preconfiguration identifier received from each of the plurality of network nodes.

Example 81. The apparatus of any of Examples 78-80, wherein the on-demand positioning signal comprises an on-demand positioning reference signal.

Example 82. An apparatus comprising: at least one processor; and at least one memory including computer program code; the at least one memory and the computer program code configured to, with the at least one processor, cause the apparatus at least to: receive, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; receive, by the user device from the first network node, a preconfiguration identifier of a selected on-demand positional signal preconfiguration that was selected based on at least one of a measured radio condition or at least one QoS requirement associated with a positioning session for the user device; and transmit, by the user device to a plurality of network nodes, including the first network node, an on-demand positioning signal based on the received preconfiguration identifier.

Example 83. The apparatus of Example 82: wherein the plurality of on-demand positioning signal preconfigurations comprise a plurality of on-demand sounding reference signal preconfigurations; and wherein the computer program code configured to, with the at least one processor, cause the apparatus to transmit comprises the computer program code configured to, with the at least one processor, cause the apparatus to transmit, by the user device to a plurality of network nodes, including the first network node, an on-demand sounding reference signal based on the received preconfiguration identifier.

Example 84. The apparatus of any of Examples 82-83, wherein the on-demand positioning signal comprises an on-demand sounding reference signal.

Example 85. An apparatus comprising: at least one processor; and at least one memory including computer program code; the at least one memory and the computer program code configured to, with the at least one processor, cause the apparatus at least to: receive, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; select, by the user device, based on at least one of a measured radio condition or a QoS requirement of a positioning session for the user device, one of the on-demand positioning signal preconfigurations; transmit, by the user device to one or more network nodes, a preconfiguration identifier associated with the selected on-demand positioning signal preconfiguration; and transmit, by the user device to one or more network nodes, including the first network node, an on-demand positioning signal based on the received preconfiguration identifier.

Example 86. The apparatus of Example 85, wherein the on-demand positioning signal comprises an on-demand sounding reference signal.

Example 87. An apparatus comprising: at least one processor; and at least one memory including computer program code; the at least one memory and the computer program code configured to, with the at least one processor, cause the apparatus at least to: transmit, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations; transmit, by the network node to the user device and at least one second network node, a preconfiguration identifier associated with a selected uplink on-demand positioning signal preconfiguration, to cause the user device to transmit the uplink positioning signal associated with the transmitted preconfiguration identifier; and receive, by the network node from the user device, an on-demand uplink positioning signal based on the transmitted preconfiguration identifier.

Example 88. The apparatus of Example 87: wherein the plurality of on-demand positioning signal preconfigurations comprise a plurality of on-demand sounding reference signal preconfigurations; and wherein the computer program code configured to, with the at least one processor, cause the apparatus to receive comprises the computer program code configured to, with the at least one processor, cause the apparatus to receive, by the network node from the user device, an on-demand sounding reference signal based on the transmitted preconfiguration identifier.

Example 89. The apparatus of any of Examples 87-88, further comprising the computer program code configured to, with the at least one processor, cause the apparatus to perform at least one of the following: select, by the network node based on at least one of a measured radio condition or a QoS requirement associated with a positioning session for the user device, the preconfiguration identifier of the selected on-demand uplink positioning signal preconfiguration; or receive, by the network node, from either a location management function or another network node, based on at least one of a measured radio condition or a QoS requirement associated with a positioning session for the user device, the preconfiguration identifier of the selected on-demand uplink positioning signal preconfiguration.

Example 90. The apparatus of any of Examples 87-89, wherein the on-demand positioning signal comprises an on-demand sounding reference signal.

Figure 14:
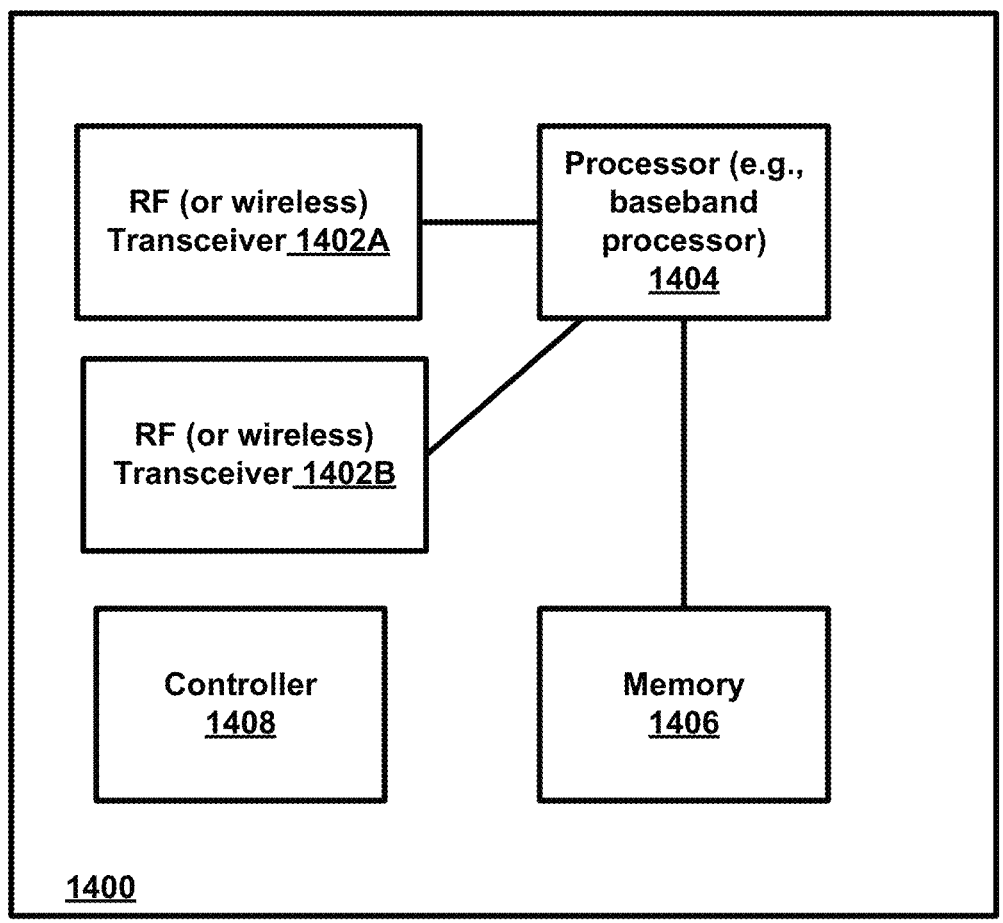
FIG. 14 is a block diagram of a wireless station (e.g., AP, BS, gNB, network node, user device, UE, or other wireless node) according to an example embodiment.

FIG. 14 is a block diagram of a network node (e.g., AP, BS, eNB, gNB, RAN node) 1400 according to an example embodiment. The wireless station 1400 may include, for example, one or more (e.g., two as shown in FIG. 14) RF (radio frequency) or wireless transceivers 1402A, 1402B, where each wireless transceiver includes a transmitter to transmit signals and a receiver to receive signals. The wireless station also includes a processor or control unit/entity (controller) 1404 to execute instructions or software and control transmission and receptions of signals, and a memory 1406 to store data and/or instructions.

Processor 1404 may also make decisions or determinations, generate frames, packets or messages for transmission, decode received frames or messages for further processing, and other tasks or functions described herein. Processor 1404, which may be a baseband processor, for example, may generate messages, packets, frames or other signals for transmission via wireless transceiver 1402 (1402A or 1402B). Processor 1404 may control transmission of signals or messages over a wireless network, and may control the reception of signals or messages, etc., via a wireless network (e.g., after being down-converted by wireless transceiver 1402, for example). Processor 1404 may be programmable and capable of executing software or other instructions stored in memory or on other computer media to perform the various tasks and functions described above, such as one or more of the tasks or methods described above. Processor 1404 may be (or may include), for example, hardware, programmable logic, a programmable processor that executes software or firmware, and/or any combination of these. Using other terminology, processor 1404 and transceiver 1402 together may be considered as a wireless transmitter/receiver system, for example.

In addition, referring to FIG. 14, a controller (or processor) 1408 may execute software and instructions, and may provide overall control for the station 1400, and may provide control for other systems not shown in FIG. 14, such as controlling input/output devices (e.g., display, keypad), and/or may execute software for one or more applications that may be provided on wireless station 1400, such as, for example, an email program, audio/video applications, a word processor, a Voice over IP application, or other application or software.

In addition, a storage medium may be provided that includes stored instructions, which when executed by a controller or processor may result in the processor 1404, or other controller or processor, performing one or more of the functions or tasks described above.

According to another example embodiment, RF or wireless transceiver(s) 1402A/1402B may receive signals or data and/or transmit or send signals or data. Processor 1404 (and possibly transceivers 1402A/1402B) may control the RF or wireless transceiver 1402A or 1402B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory including computer program code;
   the at least one memory and the computer program code configured to, with the at least one processor, cause the apparatus at least to:
   receive, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations;
   select, by the user device, based on at least one of a measured radio condition or a QoS requirement of a positioning session for the user device, one of the on-demand positioning signal preconfigurations;
   transmit, by the user device to the at least one network node, a preconfiguration identifier associated with the selected on-demand positioning signal preconfiguration; and
   receive, by the user device from the at least one network node, an on-demand positioning signal based on the transmitted preconfiguration identifier.

2. The apparatus of claim 1, wherein the positioning session for the user device comprises a positioning session to obtain and/or provide a signal measurement of the received on-demand positioning signal, for use by either the user device, the network node or a location management function in estimating a position of the user device.

3. The apparatus of claim 1:
   wherein the plurality of on-demand positioning signal preconfigurations comprise a plurality of on-demand positioning signal configurations that may be selected or requested, by the user device, for transmission; and
   wherein the computer program code configured to, with the at least one processor, cause the apparatus to receive an on-demand positioning signal comprises the computer program code configured to, with the at least one processor, cause the apparatus to receive, by the user device from the at least one network node, including the first network node, an on-demand positioning reference signal based on the received preconfiguration identifier.

4. The apparatus of claim 1, further comprising:
   the computer program code configured to, with the at least one processor, cause the apparatus to measure, as part of the positioning session to at least assist in determining a position of the user device, at least one signal parameter of the received on-demand positioning signal.

5. The apparatus of claim 1, wherein the QoS requirement associated with the positioning session for the user device comprises at least one of:
   a positioning accuracy required by the positioning session; or
   a maximum latency required by the positioning session of an on-demand positioning signal; or
   a QoS class priority associated with a service priority of the positioning session with respect to other communication sessions.

6. The apparatus of claim 1, wherein an on-demand positioning reference signal preconfiguration indicates or includes, at least one of following positioning signal attributes:
   a positioning signal bandwidth;
   a positioning signal periodicity;
   a positioning signal transmission power;
   time and frequency resources of the positioning signal;
   one or more spatial parameters of the positioning signal; and/or
   a directivity or beam width or beam shape used for transmission of the positioning signal.

7. The apparatus of claim 1:
   wherein the computer program code configured to, with the at least one processor, cause the apparatus to receive information for a plurality of on-demand positioning signal preconfigurations comprises the computer program code configured to, with the at least one processor, cause the apparatus to receive, by the user device from each of a plurality of network nodes, information for a plurality of on-demand positioning signal preconfigurations that are supported by each network node, wherein the information for the plurality of on-demand positioning signal preconfigurations includes information indicating a preconfiguration identifier and at least one quality of service (QoS) requirement or radio condition associated with each of the on-demand positioning signal preconfigurations; and
   wherein the computer program code configured to, with the at least one processor, cause the apparatus to select comprises the computer program code configured to, with the at least one processor, cause the apparatus to select, by the user device, based on at least one of a measured radio condition or a QoS requirement of a positioning session for the user device, one of the on-demand positioning signal preconfiguration for each of the plurality of network nodes.

8. The apparatus of claim 7, wherein:
   the computer program code configured to, with the at least one processor, cause the apparatus to transmit comprises the computer program code configured to, with the at least one processor, cause the apparatus to transmit, by the user device to each of the plurality of network nodes, a preconfiguration identifier associated with the selected on-demand positioning signal preconfiguration that was selected for each of the network nodes; and
   wherein the computer program code configured to, with the at least one processor, cause the apparatus to receive an on-demand positioning signal comprises the computer program code configured to, with the at least one processor, cause the apparatus to receive, by the user device from each of the plurality of network nodes, an on-demand positioning signal based on the preconfiguration identifier transmitted to each of the network nodes.

9. The apparatus of claim 8, further comprising:
the computer program code configured to, with the at least one processor, cause the apparatus to measure, as part of the positioning session for the user device to at least assist in determining a position of the user device, at least one signal parameter of each of the received on-demand positioning signals.

10. The apparatus of claim 1, wherein the on-demand positioning signal comprises an on-demand positioning reference signal.

11. An apparatus comprising:
at least one processor; and
at least one memory including computer program code;
the at least one memory and the computer program code configured to, with the at least one processor, cause the apparatus at least to:
transmit, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations;
receive, by the network node, a preconfiguration identifier associated with a selected on-demand positioning signal preconfiguration that was selected based on at least one of a measured radio condition or a QoS requirement of a positioning session for the user device; and
transmit, by the network node to the user device, an on-demand positioning signal based on the received preconfiguration identifier.

12. The apparatus of claim 11, wherein the positioning session for the user device comprises a positioning session to obtain and/or provide a signal measurement of the received on-demand positioning signal, for use by either the user device, the network node or a location management function in estimating a position of the user device.

13. The apparatus of claim 11, wherein the plurality of on-demand positioning signal configurations comprise a plurality of on-demand positioning reference signal configurations for an on-demand positioning reference signal, which is requested by the user device for transmission.

14. The apparatus of claim 11, wherein the QoS requirement associated with the positioning session for the user device comprises at least one of:
a positioning accuracy required by the positioning session;
a maximum latency required by the positioning session of an on-demand positioning signal; or
a QoS class priority associated with a service priority of the positioning session with respect to other communication sessions.

15. The apparatus of claim 11, wherein an on-demand positioning signal preconfiguration indicates or includes, at least one of following positioning signal attributes:
a positioning signal bandwidth;
a positioning signal periodicity;
a positioning signal transmission power;
time and frequency resources of the positioning signal;
one or more spatial parameters of the positioning signal; and/or
a directivity or beam width or beam shape used for transmission of the positioning signal.

16. The apparatus of claim 11, wherein the on-demand positioning signal comprises an on-demand positioning reference signal.

17. An apparatus comprising:
at least one processor; and
at least one memory including computer program code;
the at least one memory and the computer program code configured to, with the at least one processor, cause the apparatus at least to:
receive, by a user device from at least one network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations;
receive, by the user device from the at least one network node, a preconfiguration identifier associated with a selected on-demand positioning signal preconfiguration that was selected based on at least one of a radio condition or a QoS requirement associated with a positioning session for the user device;
receive, by the user device from the network node, at least one on-demand positioning signal based on the received preconfiguration identifier received from the at least one network node;
measure, by the user device as part of the positioning session to at least assist in determining a position of the user device, at least one signal parameter of the received at least one on-demand positioning signals; and
either determine, by the user device, a position of the user device based on the at least one measured signal parameter, or transmit, by the user device to another node or a location management function, the at least one measured signal parameter of each of the received at least one on-demand positioning signal.

18. The apparatus of claim 17, wherein the positioning session for the user device comprises a positioning session to obtain and/or provide at least a signal measurement of an on-demand positioning signal for use by either the user device, the network node or a location management function, in estimating a position of the user device, based on an on-demand positioning signal preconfiguration that is selected by the network node or a location management function.

19. The apparatus of claim 17:
wherein the computer program code configured to, with the at least one processor, cause the apparatus to receive a preconfiguration identifier comprises the computer program code configured to, with the at least one processor, cause the apparatus to receive, by the user device from each of a plurality of network nodes, a preconfiguration identifier associated with a selected on-demand positioning signal preconfiguration that was selected by the network node based on at least one of a radio condition or a QoS requirement associated with a positioning session for the user device; and
wherein the computer program code configured to, with the at least one processor, cause the apparatus to receive an on-demand positioning signal comprises the computer program code configured to, with the at least one processor, cause the apparatus to receive, by the user device from each of the plurality of network nodes, an on-demand positioning signal based on the preconfiguration identifier received from each of the plurality of network nodes.

20. The apparatus of claim 17, wherein the on-demand positioning signal comprises an on-demand positioning reference signal.

21. An apparatus comprising:
at least one processor; and
at least one memory including computer program code;
the at least one memory and the computer program code configured to, with the at least one processor, cause the apparatus at least to:
receive, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations;
receive, by the user device from the first network node, a preconfiguration identifier of a selected on-demand positional signal preconfiguration that was selected based on at least one of a measured radio condition or at least one QoS requirement associated with a positioning session for the user device; and
transmit, by the user device to a plurality of network nodes, including the first network node, an on-demand positioning signal based on the received preconfiguration identifier.

22. The apparatus of claim 21:
wherein the plurality of on-demand positioning signal preconfigurations comprise a plurality of on-demand sounding reference signal preconfigurations; and
wherein the computer program code configured to, with the at least one processor, cause the apparatus to transmit comprises the computer program code configured to, with the at least one processor, cause the apparatus to transmit, by the user device to a plurality of network nodes, including the first network node, an on-demand sounding reference signal based on the received preconfiguration identifier.

23. The apparatus of claim 21, wherein the on-demand positioning signal comprises an on-demand sounding reference signal.

24. An apparatus comprising:
at least one processor; and
at least one memory including computer program code;
the at least one memory and the computer program code configured to, with the at least one processor, cause the apparatus at least to:
receive, by a user device from a first network node, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations;
select, by the user device, based on at least one of a measured radio condition or a QoS requirement of a positioning session for the user device, one of the on-demand positioning signal preconfigurations;
transmit, by the user device to one or more network nodes, a preconfiguration identifier associated with the selected on-demand positioning signal preconfiguration; and
transmit, by the user device to one or more network nodes, including the first network node, an on-demand positioning signal based on the received preconfiguration identifier.

25. The apparatus of claim 24, wherein the on-demand positioning signal comprises an on-demand sounding reference signal.

26. An apparatus comprising:
at least one processor; and
at least one memory including computer program code;
the at least one memory and the computer program code configured to, with the at least one processor, cause the apparatus at least to:
transmit, by a network node to a user device, information for a plurality of on-demand positioning signal preconfigurations that are supported by one or more network nodes, wherein the information for the plurality of on-demand positioning signal preconfigurations includes information indicating a preconfiguration identifier and at least one quality of service (QoS) requirement or radio condition associated with each of the on-demand positioning signal preconfigurations;
transmit, by the network node to the user device and at least one second network node, a preconfiguration identifier associated with a selected uplink on-demand positioning signal preconfiguration, to cause the user device to transmit the uplink positioning signal associated with the transmitted preconfiguration identifier; and
receive, by the network node from the user device, an on-demand uplink positioning signal based on the transmitted preconfiguration identifier.

27. The apparatus of claim 26:
wherein the plurality of on-demand positioning signal preconfigurations comprise a plurality of on-demand sounding reference signal preconfigurations; and
wherein the computer program code configured to, with the at least one processor, cause the apparatus to receive comprises the computer program code configured to, with the at least one processor, cause the apparatus to receive, by the network node from the user device, an on-demand sounding reference signal based on the transmitted preconfiguration identifier.

28. The apparatus of claim 26, further comprising the computer program code configured to, with the at least one processor, cause the apparatus to perform at least one of the following:
selecting, by the network node based on at least one of a measured radio condition or a QoS requirement associated with a positioning session for the user device, the preconfiguration identifier of the selected on-demand uplink positioning signal preconfiguration; or
receiving, by the network node, from either a location management function or another network node, based on at least one of a measured radio condition or a QoS requirement associated with a positioning session for the user device, the preconfiguration identifier of the selected on-demand uplink positioning signal preconfiguration.

29. The apparatus of claim 28, wherein the on-demand positioning signal comprises an on-demand sounding reference signal.

* * * * *